(12) United States Patent
Yasui et al.

(10) Patent No.: US 11,571,695 B2
(45) Date of Patent: Feb. 7, 2023

(54) FLUIDIC DEVICE AND METHOD FOR SEPARATING BIOMOLECULES

(71) Applicant: CRAIF INC., Tokyo (JP)

(72) Inventors: Takao Yasui, Nagoya (JP); Yoshinobu Baba, Nagoya (JP)

(73) Assignee: Craif Inc., Tokyo (JP)

( * ) Notice: Subject to any disclaimer, the term of this patent is extended or adjusted under 35 U.S.C. 154(b) by 739 days.

(21) Appl. No.: 16/503,849

(22) Filed: Jul. 5, 2019

(65) Prior Publication Data

US 2020/0164375 A1 May 28, 2020

(30) Foreign Application Priority Data

Jul. 6, 2018 (JP) .............................. JP2018-128714
Feb. 4, 2019 (JP) .............................. JP2019-017630
Mar. 15, 2019 (JP) .............................. JP2019-049067

(51) Int. Cl.
*B01L 3/00* (2006.01)
*G01N 1/28* (2006.01)

(52) U.S. Cl.
CPC ... *B01L 3/502761* (2013.01); *B01L 3/502707* (2013.01); *G01N 1/28* (2013.01); *B01L 2200/0647* (2013.01); *B01L 2200/12* (2013.01); *B01L 2300/041* (2013.01); *B01L 2300/12* (2013.01)

(58) Field of Classification Search
CPC ..... B01L 2200/0647; B01L 2200/0652; B01L 2200/12; B01L 2300/041; B01L 2300/0877; B01L 2300/0896; B01L 2300/12; B01L 3/502707; B01L 3/502761; G01N 1/28

See application file for complete search history.

(56) References Cited

U.S. PATENT DOCUMENTS

| 2002/0117659 | A1* | 8/2002 | Lieber | ................. H01L 29/1606 257/E29.081 |
| 2010/0116656 | A1* | 5/2010 | Garcia Tello | .... G01N 27/44791 210/767 |
| 2017/0138935 | A1* | 5/2017 | Rivas | ................... G01N 29/222 |

FOREIGN PATENT DOCUMENTS

| JP | 2017158484 A | 9/2017 | |
| WO | WO-2013130714 A1 * | 9/2013 | ........ B01L 3/502761 |
| WO | WO-2014065192 A1 * | 5/2014 | ......... C12N 15/1003 |
| WO | 2015137427 A1 | 9/2015 | |
| WO | WO-2015137427 A1 * | 9/2015 | ............... B82Y 5/00 |
| WO | WO-2017015226 A1 * | 1/2017 | ........ B01L 3/502707 |

* cited by examiner

Primary Examiner — Jennifer Wecker
(74) Attorney, Agent, or Firm — McBee Moore & Vanik IP, LLC; Susan McBee

(57) ABSTRACT

The present disclosure provides a device for separating biomolecules comprising a substrate having a planar surface, nanowires disposed on at least a portion of the planar surface, and a fluid chamber formed to include at least a portion of the nanowires.

14 Claims, 16 Drawing Sheets

FLUIDIC DEVICE AND METHOD FOR SEPARATING BIOMOLECULES

FIELD OF THE INVENTION

The disclosure in this application relates to fluidic devices.

The present disclosure also relates to techniques for capturing, separating, collecting, extracting, analyzing, etc. biomolecules using nanowires.

BACKGROUND OF THE INVENTION

This application is an application filed on the basis of Japanese Patent Application No. 2018-128714 filed on Jul. 6, 2018, Japanese Patent Application No. 2019-17630 filed on Feb. 4, 2019, and Japanese Patent Application No. 2019-049067 filed on Mar. 15, 2019, all of which are incorporated herein by reference for all purposes.

Numerous techniques are known for capturing, separating, collecting, extracting, and analyzing solutes from solutions, sometimes referred to simply as "separating" hereinafter.

Some techniques for separating specific solutes from solutions or other solutes are known. For example, a number of separation techniques are known for separating biomolecules, such as proteins, nucleic acids, cells, endoplasmic reticulum, vesicles, etc., from bodily fluids or solutions of biological origin.

However, these techniques are generally time-consuming and result in low yields.

As an example, several methods, such as ultracentrifugation and aggregation reagent methods, have been described for separating existing extracellular vesicles.

The ultracentrifugation method may be the most commonly used separation technique. However, a sample volume of several 10 mL and a separation time of 4 to 5 hours are required, and it is difficult to efficiently separate the extracellular vesicles with a collection rate of about 5 to 25%.

The agglutination reagent method is a simple method of dropping an agglutination reagent onto a target sample and allowing it to stand.

Separation, however, requires prolonged standing (0.5 hours to 1 night) and may involve the use of a centrifuge, which may also lead to changes in particle size, a decrease in the number of particles, and a decrease in the amount of marker protein.

SUMMARY OF THE INVENTION

The present disclosure provides methods, devices, systems for collecting, separating, extracting, capturing, analyzing, and/or observing biomolecules or organic molecules such as extracellular vesicles, bacteria, nucleic acids, and the like.

In one embodiment, the present disclosure provides an isolation device including a substrate, a nanowire(s), and a cover (or a cover member).

In one aspect, the nanowires are formed on a first surface of the substrate, and the cover member includes a base material for a cover member. In a further aspect a flow path may be formed on a second surface of the base material for the cover member.

In a further aspect, at least a part of the first surface of the substrate and the second surface of the cover member base material are in liquid-tight contact with each other.

In a further aspect, at least a portion of the nanowires are disposed within the flow path.

In a further embodiment, the present disclosure provides a device for separating and collecting biomolecules comprising a substrate having a surface, e.g., a planar surface, nanowires disposed on at least a portion of the planar surface, and a fluid chamber formed to include at least a portion of the nanowires.

The separation device disclosed in the present application exemplarily forms a flow path on the cover member side rather than on the substrate side, thereby increasing the degree of freedom of the flow path design of the analysis device.

DETAILED DESCRIPTION OF THE INVENTION

Figure 1A:
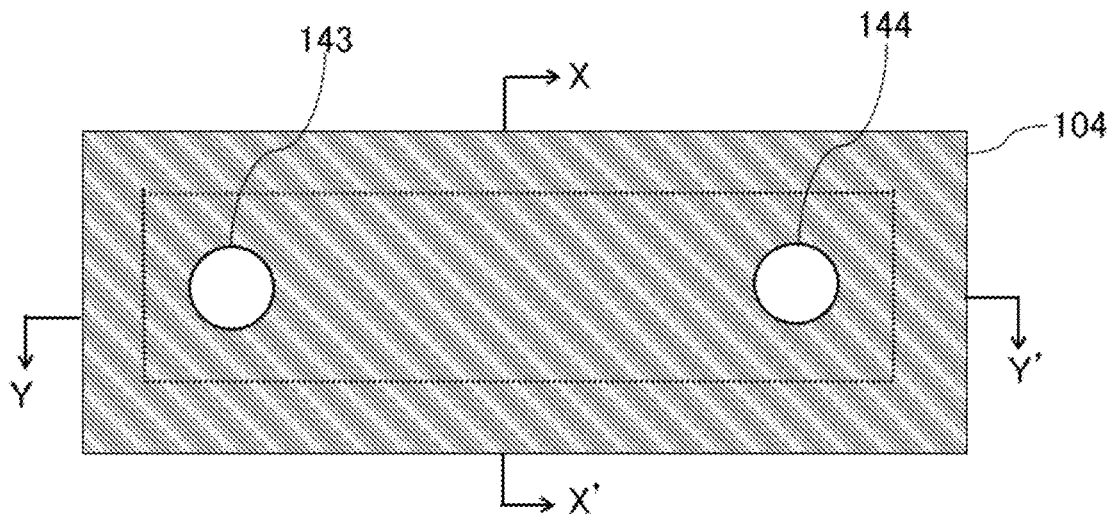
FIG. 1A is a top view describing a fluidic device according to an embodiment.

Unless otherwise defined, all technical and scientific terms used herein have the same meaning as commonly understood by one of ordinary skill in the art to which this invention belongs.

Where a range of values is provided, unless the context clearly dictates otherwise, one tenth of the units of the upper and lower limits of the range and intervening values within the indicated range or any other recited value are encompassed within the scope of the present invention.

The upper and lower limits of these smaller ranges may independently be included within smaller ranges, and are also included within the scope of the present invention, subject to any specifically excluded limitation within the described ranges.

Where the recited ranges include one or both of the limitations, ranges excluding any of those included limitations are also included in the present invention.

In the following description, numerous specific details are set forth in order to provide a more thorough understanding of the present invention.

However, it will be apparent to one skilled in the art that the present invention may be practiced with one or more of these specific details.

In other instances, well-known features and procedures have not been described in detail in order to avoid obscuring the present invention.

As used herein, the terms "including" and "comprising" are intended to mean that the structures and methods include the recited elements but do not exclude others. Embodiments defined by each of these transition terms are within the scope of the present invention.

Thus, the methods and compositions, configurations can "include" additional steps and components.

All numerical representations, including ranges, e.g., length, pH, temperature, time, concentration, and molecular weight, are approximations that change to (+) or (−) in 0.1 increments.

Of course, it is not explicitly stated that the term "about" or "approximately" precedes all numerical designations.

The term "about" or "approximately" also includes the exact value "X" in addition to a small increment of "X", such as "X+0.1" or "X−0.1".

The reagents described herein are exemplary only, and their equivalents are known in the art.

The present disclosure provides, as one embodiment of a device for separating or collecting molecules in a fluid from a fluid, a device for separating, collecting or analyzing molecules from a fluid comprising: a substrate having a planar surface; nanowires disposed on at least a portion of the planar surface; and a fluid chamber formed to include at least a portion of the nanowires.

A "fluid" may be a solution.

The gas may comprise steam.

The solute of the solution may be a liquid or a gas.

The solution may be an aqueous solution or a non-aqueous solution.

The solution may contain a substance of interest to be separated, collected or analyzed.

The substance to be separated, collected or analyzed may be an inorganic molecule or an organic molecule.

The molecule of interest may be a biomolecule.

The biomolecule may be a molecule of natural origin, may be an artificially synthesized molecule, or may include both.

In some embodiments, the molecule of interest may be charged.

The charge of the molecule of interest may be the opposite charge of the surface of the nanowire.

In some embodiments, the molecule of interest may be substantially uncharged.

In one aspect, the substance or biomolecule of interest may be in an aqueous carrier or in the form of a composition.

In another embodiment, the composition may comprise one or more of an adjuvant, an immuno-enhancing adjuvant, a diluent, a pharmaceutically acceptable salt, and/or an aqueous carrier.

A "biomolecule" may be a biological material.

A biological material is a generic term for an organic compound of a macromolecule which is contained in a living body or is artificially synthesized and which functions in relation to a life phenomenon, and refers to, for example, a peptide, a protein, a lipid, a nucleic acid, a hormone, a sugar, an amino acid, and the like.

The biomolecule may be a complex of biomolecules, e.g., a complex of proteins, or a multiprotein complex.

The biomolecule may be a nucleic acid.

The biomolecule may be a vesicle.

The substance to be collected (extraction, retrieval, etc.; hereinafter also referred to as collection) may not be a biomolecule, but may be a non-biomolecule.

The collected material may be an inorganic molecule, an organic molecule, or the like.

The biomolecules used here can be in liquid, gas, steam, aerosol or in the breath of the subject.

Subjects can be humans as well as animals including mice, rats, rabbits, cats, dogs, cows, horses, pigs, monkeys, and the like.

In one aspect, the biomolecule may be, and may comprise, a ribonucleic acid(s) (RNA). RNA may be, but is not limited to, messenger RNA (mRNA), transfer RNA (tRNA), ribosomal RNA (rRNA), non-coding RNA (ncRNA), microRNA (miRNA), ribozymes, double-stranded RNA (dsRNA), and the like, and may include a plurality thereof.

RNA may be modified.

RNA or miRNA may be involved in the development or progression of cancer, cardiovascular disease, neurodegenerative disease, psychiatric disease, chronic inflammatory disease, etc.

The miRNA may be a type of RNA that promotes or positively regulates oncogenesis (onco miRNA (oncogenic miRNA, cancer-promoting miRNA)) or a type of RNA that suppresses or negatively regulates oncogenesis (tumor suppressor miRNA (cancer-suppressing miRNA)).

The biomolecule may be an exosome, an exosome complex.

The biomolecule may be a molecule contained within an exosome.

In one aspect, the nucleic acid may be a deoxyribonucleic acid (DNA) and may comprise DNA.

The DNA may be polymorphic or modified, such as methylated.

The biomolecule may be an organelle or a vesicle.

Vesicles may be, but are not limited to, vacuoles, lysosomes, transport vesicles, secretions, gas vesicles, extracellular matrix vesicles, extracellular vesicles, and the like, and may include a plurality thereof.

Extracellular vesicles include, but are not limited to, exosomes, exotomes, shedding microvesicles, microvesicles, membrane particles, and plasma membrane, apoptotic body, etc.

The vesicle may contain a nucleic acid(s).

The biomolecule may be, but is not limited to, a cell or may include a cell.

The cells may be red blood cells, white blood cells, immune cells, etc.

The biomolecule may be a virus, a bacterium, or the like.

Specific examples of cells, viruses, and bacteria include those having a cell membrane structure, and include bacteria such as staphylococcus, *Bacillus subtilis*, *E. coli*, *Salmonella*, *Pseudomonas aeruginosa*, *Vibrio cholerae*, *Shigella*, *Bacillus anthracis*, tuberculosis, botulinum, tetanus, and *Streptococcus*, and blood cells such as granulocytes, lymphocytes, reticulocytes, red blood cells, leukocytes, platelets, and the like.

Viruses include noroviruses, rotaviruses, influenza viruses, adenoviruses, coronaviruses, measles viruses, rubella viruses, hepatitis viruses, herpes viruses, HIV, and the like. Bacteria include mushrooms, molds, yeasts, and the like, and specifically include *Tinea, Candida, Aspergillus, Saccharomyces cerevisiae*, and the like.

In addition to extracellular vesicles, samples include mitochondria and extracellular vesicles.

The solution may be a bodily fluid, a fluid derived from a bodily fluid, such as a diluent, a treatment fluid, or the like.

The solution may be a non-body fluid solution, an artificially prepared liquid, or a mixture of a body fluid or a solution derived from a body fluid and a solution derived from a non-body fluid.

The solution may be a solution used for sample measurement or a solution used for calibration measurement.

It may be used as a solution, as a stock solution, or it may be a diluted or concentrated liquid.

The solution may be a standard solution or a calibration solution.

The sample to be measured may be a sample such as clinical or non-clinical specimens. The solution may comprise a physiological buffer, such as phosphate buffered saline (PBS) or N-tris(hydroxymethyl)methyl-2-aminoethanesulfonic acid buffer (TES), containing the material to be collected.

The bodily fluid may contain additives.

For example, stabilizers and pH modifier may be added in additives.

The "body fluid" may be a solution.

The bodily fluid may be in a liquid state or in a solid state, e.g., frozen state.

The solution may contain a substance to be collected, such as a biomolecule, or may not contain a substance to be collected, and contains a substance for measuring the substance to be collected.

The bodily fluid may be a bodily fluid of an animal.

The animal may be a reptile, mammal, amphibian.

The mammal may be a primate such as a dog, cat, cow, horse, sheep, pig, hamster, mouse, squirrel, and monkey, gorilla, chimpanzee, bonovo, human.

The body fluid may be lymph fluid, tissue fluid such as interstitial fluid, intercellular fluid, interstitial fluid, and the like, and may be body cavity fluid, serosal fluid, pleural fluid, ascites fluid, capsular fluid, cerebrospinal fluid (cerebrospinal fluid), joint fluid (synovial fluid), and aqueous humor of the eye (aqueous).

The body fluid may be digestive fluid such as saliva, gastric juice, bile, pancreatic juice, intestinal fluid, etc., and may be sweat, tears, runny nose, urine, semen, vaginal fluid, amniotic fluid, milk, etc.

By "urine" is meant liquid waste produced by the kidneys.

The urine may be a liquid or substance drained through the urethra to the outside, or it may be a liquid or substance accumulated in the bladder.

By "saliva" is meant a secretion that is secreted into the oral cavity from the salivary glands.

The bodily fluids may be collected, extracted, collected, etc. (hereinafter referred to simply as collection) invasively, or may be collected non-invasively.

Extractors, such as syringes, may be used to extract, collect, and collect from the body. The solution may be a bodily fluid of a healthy subject, may be a bodily fluid of a subject with a particular disease, or may be a bodily fluid of a subject suspected of suffering from a particular disease or a subject to be tested for suffering from a particular disease.

In some embodiments, the disease may be cancer.

The cancer may be a solid cancer or a hematologic cancer.

The solid cancer may be an epithelial cancer or may be a non-epithelial cancer.

The cancer may be, for example, but not limited to, a hematopoietic cell malignancy, leukemia, lymphoma, multiple myeloma, brain tumor, breast cancer, uterine body cancer, cervical cancer, ovarian cancer, esophageal cancer, stomach cancer, appendiceal cancer, colorectal cancer, liver cancer, cholecystic cancer, cholangiocarcinoma, pancreatic cancer, adrenal cancer, gastrointestinal stromal tumor, mesothelioma, head and neck cancer (such as laryngeal cancer, oral cancer, salivary gland cancer, paranasal cavity cancer), thyroid cancer, kidney cancer, lung cancer, osteosarcoma, Ewing sarcoma, chondromoma, prostate cancer, testicular tumor, renal cell cancer, bladder cancer, rhabdomyosarcoma, skin cancer, anal cancer, or the like, any plurality of these cancers, and the like, or may selected from a group of any plurality thereof.

A "device" may, in some embodiments, be a device used to separate and collect solutes from a solution.

In some embodiments, a "device" may be a device used to analyze a substance in a solution.

In some embodiments, a "device" may be used to separate organic molecules from solution.

In some embodiments, a "device" may be used to separate a biomolecule from a solution. A "device" may be a fluidic device, a flow path device, a combination thereof, or a device including any thereof.

By "substrate" is meant a material or member on which layers, structures, devices, etc. are formed.

The substrate exemplarily includes, but is not limited to, semiconductors, metals, insulators, organic materials, polymeric materials, and the like.

In one aspect, the substrate can have any shape of structure, e.g., a planar structure in which the major surfaces are parallel to each other, a curved structure in which the major surfaces may not be parallel to each other, or a combination thereof.

The substrate may have a three-dimensional structure.

The substrate may be formed of a material on which a catalyst layer can be stacked. e.g. semiconductor materials such as silicon, quartz glass, glass materials such as Pyrex® glass, ceramics, polymer material include plastic, and the like may be used.

In some embodiments, the substrate may be substantially flexible and may be stretchable.

In some embodiments, the substrate may be substantially non-flexible.

In some embodiments, the device may have a cover.

By "cover" is meant another substrate that contacts or is bonded against the substrate.

The cover may have the function of substantially enclosing the features formed on the substrate.

In some embodiments, the flow path may include a cover.

In one example, the cover may be part of the flow path.

In some embodiments, a portion of the cover may be a portion of the flow path.

In some embodiments, the device may not have a cover.

In one aspect, the device may be configured with a first substrate and a second substrate.

In one aspect, nanowires may be disposed on at least one of the first substrate and the second substrate.

In one aspect, a device may be configured with a substrate and a flow path (or a fluidic channel, fluidic path, or flow channel) defining portion.

In one embodiment, it is not necessary to have a member for defining the flow path other than the substrate.

In one example, the structure of the substrate surface may define the flow path.

A surface structure defining the flow path may be defined by a mechanical configuration such as a step.

The mechanical structure, such as a step, may be a macroscopic structure.

For example, the flow path may be defined by digging the substrate.

For example, the flow path may be defined by coating, bonding, bonding, or the like a member, a film, a second substrate, or the like that defines the side wall of the flow path when the substrate surface is the bottom surface.

For example, the flow path, may be defined by differences in the chemical state or roughness or microstructure of the substrate surface, such as hydrophilic hydrophobicity.

In one aspect, the flow path may be defined by a combination of these structures.

In some embodiments, a cover may be further disposed in any of these flow paths.

In this disclosure, in principle, "substrate" is used to mean a substrate on which nanowires are disposed (also referred to as a nanowire substrate) and "cover" or "cover member" is used to mean a different substrate than the substrate on which nanowires are disposed, the member being bonded to the nanowire substrate and being used to form a fluid chamber or flow path.

The substrate and the cover may each have a bonding surface defined as a point to be bonded or bonded to the other.

The cover may have a recess or recessed structural region relative to a standard or reference surface, e.g., a bonding surface.

The recess or the like may be surrounded by a wall of the bonding surface and may be configured to be substantially sealed by bonding with the substrate.

The bonding of the cover and the substrate may substantially define or define a fluid chamber.

The bonding surfaces of the cover and substrate joints or bonding surfaces may be liquid-tight in some embodiments and non-liquid-tight in some embodiments.

Part or all of a member forming a fluid chamber or a flow path, such as a substrate or a cover, may be formed of an inorganic material or may be formed of an organic material. The inorganic material forming the substrate may be, for example, a metal, silicon, or other semiconductor material, or an insulating material such as glass, ceramics, or a metal oxide.

The member forming the fluid chamber or the flow path, such as the substrate or the cover, may be formed of a polymer material.

The polymeric material may be a natural resin, a synthetic resin, or a mixture thereof. The synthetic resin may be a thermosetting resin, a thermoplastic resin, or another resin. The thermosetting resin may be, for example and without limitation, a phenolic resin (PF), an epoxy resin (EP), a melamine resin (MF), a urea resin (urea resin, UF), an unsaturated polyester resin (UP), an alkyd resin, a polyurethane (PUR), a thermosetting polyimide (PI), or the like.

The thermoplastic resin may be:

a general-purpose plastic such as, for example, polyethylene (PE), high-density polyethylene (HDPE), medium-density polyethylene (MDPE), low-density polyethylene (LDPE), polypropylene (PP), polyvinyl chloride (PVC), polyvinylidene chloride, polystyrene (PS), polyvinyl acetate (PVAc), polyurethane (PUR), teflon-(polytetrafluoroethylene, PTFE), ABS resin (acrylonitrile butadiene styrene resin), AS resin, acrylic resin (PMMA);

an engineering plastic such as, for example, polyamide (PA), nylon, polyacetal (POM), polycarbonate (PC), modified polyphenylene ether (m-PPE, modified PPE, PPO), polyethylene terephthalate (PET), glass fiber reinforced polyethylene terephthalate (GF-minus PET), polybutylene terephthalate (PBT), cyclic polyolefin (COP);

a super engineering plastic such as polyphenylene sulfide (PPS), polytetrafluoroethylene (PTFE) (commonly referred to as Teflon®), polysulfone (PSF), polyether sulfone (PES), amorphous polyarylate (PAR), liquid crystal polymer (LCP), polyether ether ketone (PEEK), thermoplastic polyimide (PI), polyamide imide (PAI).

As a material of the cover, a material that facilitates cutting or transfer of a mold may be used.

In some embodiments, the material of the cover may be a resin that is incompatible with the biomolecule.

In some embodiments, the material of the cover may be light transmissive.

Materials for the covers include, for example, cycloolefin polymer (COP), polydimethylsiloxane (PDMS), polymethylmethacrylate (PMMA), polycarbonate (PC), plastics such as hard polyethylene, silicone, and the like.

In some embodiments, the member forming the fluid chamber or flow path, such as the substrate or cover, may be substantially flexible or telescopic.

In some embodiments, the substrate may be substantially non-flexible.

In some embodiments, the fluid chamber, flow path chamber, or flow path (also referred to simply as a flow path, flow path portion, or a fluid channel, in the present disclosure) may have a plurality of inner walls.

The fluid chamber or flow path may have a space substantially surrounded by a plurality of inner walls.

The fluid chamber or flow path may have a polygonal cross-section in part.

The polygon may be, for example, a triangle, a quadrilateral, a pentagon, a hexagon, an octagon, or the like.

The plurality of inner walls may be comprised of a flat inner wall, an inner wall having a curved surface, or a combination thereof.

In some embodiments, the fluid chamber or flow path may have a curved, continuous inner wall.

For example, the fluid chamber or the flow path may have a shape in which a cross section of a part thereof is formed by a circle, an ellipse, or other curves.

In some embodiments, the fluid chamber may define a closed space surrounded by an inner wall.

The solution may be introduced through an openable and closable inlet.

In some embodiments, the fluid chamber may have an inlet and an outlet for the solution.

In some embodiments, the fluid chamber is configured as a flow path and may be in fluid communication with other chambers or components.

In some embodiments, the fluid chamber may have air holes.

The fluid chamber may include a plurality of fluid chambers.

The fluid chambers may have a port or a hole, introduction port, entrance, input, sample input and/or outlet, exhaust, drain, exit port, collection port, and sample collection port that are fluid connected to the outside of the bond.

The recess or the like may be fluidly connected to the outside after bonding with the substrate, or may have one, a plurality, two or more, or at least one flow path controlled to be fluidly connected to the outside.

The substrate may be fluidly connected to the outside after bonding with the cover, and may have one, a plurality, two or more, or at least one flow path controlled to be fluidly connected to the outside.

In one aspect, the surface of the substrate on which the nanowires are disposed may be any type of surface, such as a flat surface, a curved surface, or a combination thereof.

In the present disclosure, a "nanowire surface" refers to the surface of a substrate or cover on which nanowires are disposed, grown, or formed.

In the present disclosure, this plane is also referred to as the "first plane".

In some embodiments, a "nanowire plane" may have nanowires disposed substantially throughout it.

In some embodiments, the "nanowire surface" may have nanowires disposed on a portion thereof.

In some embodiments, the surface of the substrate on which the nanowires are disposed may not be flat.

For example, a recess or a flow path may be formed in the substrate, and nanowires may be disposed on the inner wall of the bottom surface, the side surface, or the like of the recess or the flow path.

In one aspect, the surface of the substrate on which the nanowires are disposed may have a step.

In one aspect, the surface of the substrate on which the nanowires are disposed may not be strictly flat and may have roughness.

The surface roughness may be less than or equal to a value of 1 mm, 500 µm, 100 µm, 50 µm, 10 µm, 5 µm, 1 µm, 500 nm, 100 nm, 50 nm, or 10 nm.

The surface roughness may be less than or equal to ½, ⅓, ¼, ⅕, ⅒, 1/20, 1/25, 1/50, 1/100, 1/200, 1/500, 1/1000, 1/2000, 1/5000, or 1/10000 of the vertical channel size of the surface.

The surface roughness can be defined by, for example and without limitation, Ra, Rq, Rrms, Rmax, Rv, Rp, Rt, Rku, and the like.

In one aspect, the surface roughness may be caused by a surface treatment on the substrate surface.

The surface treatment may be, for example, without limitation, mechanical polishing, chemical treatment, chemical mechanical polishing, chemical treatment, plasma or energy particle irradiation, vapor deposition of a substance on a surface, and the like.

In one aspect, "first surface" means the surface of the substrate on which the nanowires are formed.

For example, as described below, the member on the "first surface" of the substrate may optionally be a substrate, a catalyst layer, or a coating layer.

In the case where the nanowire is grown on the "first surface" in close contact with the "second surface" of the cover member, the flat portion at the base of the nanowire may be the "first surface".

The nanowires may be arranged substantially perpendicular to the plane of the substrate on which they are arranged.

The nanowires may be arranged non-perpendicularly to the plane of the substrate on which they are arranged.

The plurality of nanowires may be disposed at different angles relative to the substrate surface on which they are disposed.

The nanowires may be arranged parallel to the plane of the substrate on which they are arranged.

The nanowires may have branched chains.

The nanowires may have a single structure without branched chains or unbranched.

The plurality of nanowires may include nanowires having branched chains and unbranched nanowires.

The nanowires may be periodically arranged at regular intervals on the substrate surface on which they are arranged.

The nanowires may be arranged randomly or aperiodically on the substrate surface on which they are arranged.

The nanowires may be formed from origins on the substrate surface

The nanowires may be arranged to extend from an origin on the substrate surface.

In some embodiments, the nanowires may be directly fixed (or immobilized) to the material forming the flow path or fluid chamber.

The nanowires may be grown directly from the substrate surface.

In some embodiments, the nanowires may be partially embedded in the substrate surface.

The nanowires may be grown from a growth wire embedded in the substrate surface as a starting point.

In some embodiments, the nanowires may be disposed across the substrate surface. In some embodiments, the nanowires may be disposed on a portion of the substrate surface.

A "nanowire" may be in contact with or fixed or immobilized to a substrate at one end thereof.

A "nanowire" may have an end that is in contact with or not fixed or immobilized to a substrate.

The end is referred to as the "tip".

If one end of the nanowire is inside the substrate, its tip may also be referred to as the "embedded end".

"Nanowire" means a structure whose maximum, minimum, average, or other distinctive sizes in a section are at the nanometer, sub-nanometer, 10 nanometer, 100 nanometer, or sub-micrometer levels, unless the diameter or distinctive size is defined.

The length of the "nanowire" is a longitudinally defined size and may be from a nanometer level to a 10 nanometer level, a 100 nanometer level, or a sub-micrometer level.

"Nanowire" means a rod-like, wire-like structure having a size such as a cross-sectional shape or diameter on the order of nanometers (e.g., a diameter of 1 to several hundred nanometers, for example, without limitation).

In one aspect, the length of the nanowires described herein is from about 0.1 nanometers to about 500 nanometers, from about 1 nanometer to about 250 nanometers, from about 1 nanometer to about 100 nanometers, or from about 5 nanometers to about 50 nanometers.

The cross-section of the nanowires may be substantially circular, elliptical, regular polygonal, polygonal, hollow body.

The outer shape of the nanowires may be substantially cylindrical, elliptical or polygonal.

The nanowires may be hollow or hollow bodies or may be substantially material-packed structures.

The nanowire may be formed of one material or a plurality of materials.

The nanowire may be coated on its surface with a coating material.

In one aspect, the nanowires may not be physically, chemically or physicochemically fixed to the substrate surface.

For example, the nanowires or aggregates thereof may be disposed in contact with or in proximity to the substrate surface.

The nanowires may be macroscopically immobilized or moved by the introduction of the solution.

In some embodiments, the nanowires may be mechanically contacted to the substrate surface, mechanically contacted substantially to the substrate surface, or mechanically substantially fixed in proximity to the substrate surface.

For example, an aggregate of nanowires (e.g., macroscopically or microscopically in the form of a sheet) may be fixed to the surface of the substrate using an insert, an adhesive, or the like.

In some embodiments, the nanowires may be formed directly on the substrate without the catalyst layer or without forming the catalyst layer.

In some embodiments, a surface treatment such as an activation treatment, a hydrophilic treatment, a heat treatment, or a hydrothermal treatment may be performed on the surface of the substrate (inner wall) or the surface of the catalyst layer on which the nanowires are formed or grown.

The surface treatment may be, for example, plasma treatment, particle (ion, radical, neutral atom, or the like) beam irradiation, light (electromagnetic wave) irradiation such as UV or EUV, electron beam irradiation, mechanical treatment such as polishing, or the like.

The surface treatment may be, for example, a treatment for increasing the presence of oxygen which combines with a metal to form a Lewis acid.

In some embodiments, performing the surface treatment may include performing a plurality of surface treatments.

In some embodiments, two, two or more or more surface treatments may be performed simultaneously, in time series, or a combination thereof.

The material of the nanowires may be an inorganic material or an organic material.

The nanowires may be or include metals, non-metals, semiconductors, mixtures or alloys thereof, or oxides or nitrides thereof.

The material of the nanowire may be or include a polymeric material.

The nanowires may be wires, whiskers, fibers, mixtures or composites thereof,

Metals used for the materials of the nanowires include, but are not limited to, typical metals (alkali metals: Li, Na, K, Rb, Cs, alkaline earth metals: Ca, Sr, Ba, Ra), magnesium group elements: Be, Mg, Zn, Cd, Hg, aluminum group elements: Al, Ga, In, rare earth elements: Y, La, Ce, Pr, Nd, Sm, Eu, tin group elements: Ti, Zr, Sn, Hf, Pb, Th, iron group elements: Fe, Co, Ni, earth elements: V, Nb, Ta, chromium group elements: Cr, Mo, W, Au, Cu, copper group elements. Rh, Pd, Os, Ir, Pt, natural radioactive elements: U and Th-based radioactive decay products: U, Th, Ra, Rn, actinoids, transuranic elements: Np, Pu, Am, Cm, Bk, Cf, Es, Fm, Md, No, etc., uranium or later, or alloys thereof.

The nanowire may be an oxide of any one of the above metals or alloys, or an alloy or mixture, and may include an oxide.

The material of the nanowires, or at least the surfaces of the nanowires, e.g., cladding, may be, for example, without limitation, $ZnO$, $SiO_2$, $Li_2O$, $MgO$, $Al_2O_3$, $CaO$, $TiO_2$, $Mn_2O_3$, $Fe_2O_3$, $CoO$, $NiO$, $CuO$, $Ga_2O_3$, $SrO$, $In_2O_3$, $SnO_2$, $Sm_2O_3$, and $EuO$.

Nanowire may be grown by the following methods: Pulse Laser Deposition, Physical Deposition such as VLS (Vapor-Liquid-Solid), Chemical-Vapor-Deposition, Arc Discharge, Laser Evaporation, Organic Metal Gas Phase Selective Growth, Hydrothermal Synthetic, Reactive Ion Etching, Firing, Melting, Sputter, etc.

The nanowires may be charged.

The nanowires may have a charge opposite to that of the material to be collected or extracted.

Thereby, by way of non-limiting example, charged biomolecules such as extracellular vesicles, nucleic acids, etc. can be efficiently attracted and adsorbed.

The nanowires may be fixed to the material forming the flow path or fluid chamber via other materials or members.

The material between the nanowires and the wall material may have a catalyst for nanowire growth or may be a non-catalytic material.

The nanowires may be grown through a catalyst layer, an adhesion layer, or a growth nucleus.

The "layer" may be a thin film. The "layer" may be a continuous membrane. The "layer" may be discontinuous. The "layer" may be a continuous membrane, and the membrane may have a hole(s). The "layer" may be a plurality of separate thin films. The "layer" may be or include an island. The "layer" may be or include a particle.

The nanowires may, for example, be grown on a catalyst layer using hydrothermal synthesis methods.

For example, when ZnO fine particles are used, growth may be performed using a hydrothermal synthesis method.

Specifically, as a non-limiting example, heated substrates may be immersed in a precursor solution of zinc nitrate hexahydrate (Zn(NO3)2.6H2O), hexamethylenetetramine (C6H12N4) dissolved in deionized water, to grow ZnO nanowires where ZnO particles (catalytic layers) are exposed.

The catalyst layer, adhesion layer, growth nucleus may be a metal, alloy, non-metal, semiconductor, oxide, nitride, etc. thereof, or a mixture thereof.

Metals include, but are not limited to, typical metals (alkali metals: Li, Na, K, Rb, Cs, alkaline earth metals: Ca, Sr, Ba, Ra), magnesium group elements: Be, Mg, Zn, Cd, Hg, aluminum group elements: Al, Ga, In, rare earth elements: Y, La, Ce, Pr, Nd, Sm, Eu, tin group elements: Ti, Zr, Sn, Hf, Pb, Th, iron group elements: Fe, Co, Ni, earth elements: V, Nb, Ta, chromium group elements: Cr, Mo Os, Ir, Pt, natural radioactive elements: radioactive decay products based on U and Th: U, Th, Ra, Rn, actinoids, transuranic elements: Np, Pu, Am, Cm, Bk, Cf, Es, Fm, Md, No, etc.

The oxide may be an oxide of any one or alloy thereof.

The growth nuclei of the nanowires may be formed of a material different from the substrate material.

The growth nuclei of the nanowires may be formed of a material different from that of the nanowires.

The growth nuclei of the nanowires may be formed of substantially the same material as the substrate material.

The growth nucleus of the nanowire may be, for example, a surface having structural roughness.

The growth nuclei of the nanowires may, for example, be surfaces that have different properties in the chemical moiety.

Mechanically, structurally or chemically different (mottled) surfaces may be more susceptible to nanowire growth nuclei in some areas than in others.

For example, by using lithography and dry wet etching. or the like, unevenness may be formed.

For example, ions, neutral atoms, plasma, or the like may be irradiated to form mechanically, structurally, or chemically different (mottled) surfaces.

The length of the nanowires may be greater than or greater than, for example, but not limited to, values of 500 nm, 1 µm, 1.5 µm, 2 µm, 3 µm, 4 µm, 5 µm, 6 µm, 7 µm, 8 µm, 9 µm, 10 µm, 11 µm, 12 µm, 13 µm, 14 µm, 15 µm, 17 µm, 20 µm, etc.

The length of the nanowires may be, for example, but not limited to, equal to or less than or equal to 1 µm, 1.5 µm, 2 µm, 3 µm, 4 µm, 5 µm, 6 µm, 7 µm, 8 µm, 9 µm, 10 µm, 11 µm, 12 µm, 13 µm, 14 µm, 15 µm, 17 µm, 20 µm, 50 µm, 100 µm, 200 µm, etc.

The diameter (or size in the thickness direction) of the nanowires may be equal to or larger than e.g., 5 nm, 10 nm, 15 nm, 20 nm, 25 nm, 30 nm, 40 nm, 50 nm, 60 nm, 70 nm, 80 nm, 90 nm, 100 nm, 150 nm, 200 nm, 250 nm, 300 nm, 400 nm, 500 nm, etc.

The diameter (or size in the thickness direction) of the nanowires may be equal to or smaller than (e.g., 10 nm, 15 nm, 20 nm, 25 nm, 30 nm, 40 nm, 50 nm, 60 nm, 70 nm, 80 nm, 90 nm, 100 nm, 150 nm, 200 nm, 250 nm, 300 nm, 400 nm, 500 nm, 1 µm, etc.

Polymers used in nanowire materials may be, for example, but not limited to, polymethylmethacrylate (PMMA), polystyrene (PS), polydimethylsiloxane (PDMS), conductive polymers poly(3,4-ethylenedioxythiophene)/poly(4-styrenesulfonic acid) (PEDOT/PSS), polyethylene naphthalate (PEN), polyethylene terephthalate (PET), polyimides (PI), and the like.

The nanowires may be or comprise a fibrous material.

The fiber material may be a synthetic fiber, a natural fiber, a mixture thereof, or a mixed fiber.

The fiber material may be, for example and without limitation, polyester, polypropylene, polyacrylic, polyamide, copolymerized polyester-based fiber, polyolephene-based fiber, polyvinyl alcohol-based fiber, and the like.

The fiber material may be, for example and without limitation, vegetable fiber such as cotton, hemp, cleft, and the like.

The fiber material used for the nanowires may be woven or non-woven.

In some embodiments, the nanowires may be a laminate of fibrous materials.

In some embodiments, the nanowires may be structures of short fibers.

The length of the short fibers may be random or may have regularity.

The short fiber axes may be randomly arranged or regularly arranged.

In some embodiments, the synthetic fibers may be low melting point materials.

The low melting point material may be, for example and without limitation, a copolymerized polyester-based fiber, a polyolephene-based fiber, a polyvinyl alcohol-based fiber, or the like.

In some embodiments, the synthetic fibers may have a core-sheath structure in which the sheath comprises a low melting point polymer.

The spacing of the surface (surface) facing the surface having the nanowires may be twice the length of the nanowires (or the size in the normal direction of the surface on which the nanowires are arranged, and so on), less than twice, 1.5 times, 2 times or more, 3 times, 4 times, 5 times, 6 times, 7 times, 8 times, 9 times, 10 times or more.

The spacing of the surface facing the surface with the nanowires may be less than or equal to 10, 9, 8, 7, 6, 5, 4, 3, etc. times the length of the nanowires.

In some embodiments, a non-planar region is formed in the flow path for generating turbulence or agitating the solution in the sample liquid passing through the flow path.

In some embodiments, a three-dimensional microstructure or a three-dimensional concavo-convex structure may be formed on the inner surface of the flow channel.

In some embodiments, a structure having the function of a chaotic mixer may be formed on the inner surface of the flow path.

A chaotic mixer allows the fluid flowing into the flow path to be agitated and mixed.

Hereinafter, each embodiment of a separation device (hereinafter, sometimes simply referred to as a "device") will be described in detail with reference to the drawings.

First Embodiment

The nanowires may be disposed directly on the substrate (non-embedded).

Figure 1B:
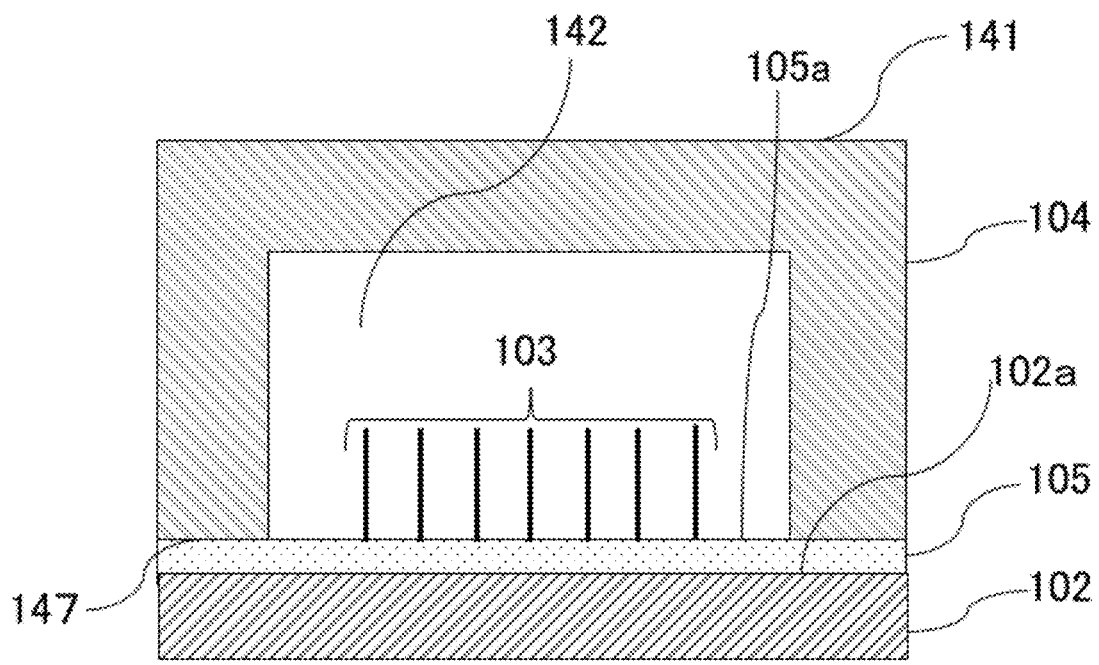
FIG. 1B is a cross-sectional view describing a fluidic device according to an embodiment.
Figure 1C:
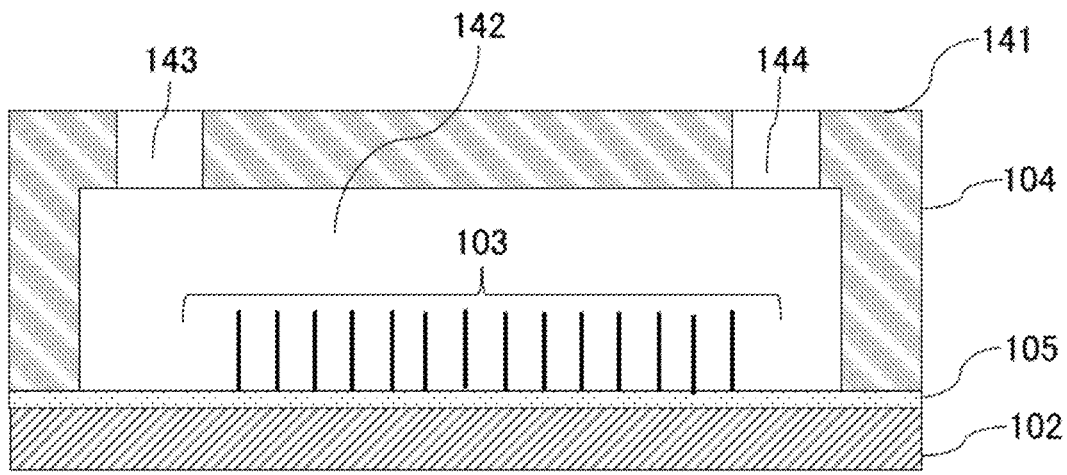
FIG. 1C is a cross-sectional view describing a fluidic device according to an embodiment.

Referring to FIGS. 1A to 1C, devices 101 having non-embedded nanowires according to the first embodiment will be described.

FIG. 1A illustrates a top view of the device 101, FIG. 1B illustrates a X-X' cross-sectional view of the device 101 in the drawing 1A, and FIG. 1C illustrates a Y-Y' cross-sectional view of the device 101 in the drawing 1A.

The device 101 includes at least a substrate 102, nanowires 103 formed on a flat surface 102a of the substrate 102, and a cover member 104.

As shown in FIGS. 1B and 1C, device 101 include catalytic layers 105 for forming nanowires 103.

In the device 101, the catalyst layer 105 is formed on the substrate 102, and the nanowires 103 are formed on the catalyst layer 105, i.e., on the first surface 105a of the device 101 (see 1B to FIG. 1).

In the cover member 104, a flow path 142 is formed in a concave shape with respect to the cover member base material 141.

In this specification or this embodiment, the "second surface" means a surface of the cover member base material 141 on the side where the flow path 142 is formed (when the opening portion of the flow path 142 is an imaginary plane, a surface following the imaginary plane).

In the example shown in the drawing 1B, the surface of the cover-member base material 141 in contact with the catalytic layers 105 corresponds to the second surface 147.

In some embodiments, a device of the present disclosure may have a sample input hole to the flow path and a sample collection hole from the flow path.

The sample input hole and the sample collection hole may be arranged such that the input sample liquid (solution) is introduced into the region where the nanowires are formed, and after passing through the nanowire region, the sample liquid is discharged (drained, exhausted, output) to the outside of the device.

As shown in the drawing 1C, the covering member 104 of the present embodiment has a sample input hole 143 and a sample collection hole 144.

As shown in the drawing 1C, the sample input hole 143 and the sample collection hole 144 penetrate the cover 104 from the second surface of the flow path 142 to the other outer surface of the cover 104.

That is, the sample input hole 143 and the sample collection hole 144 fluidly connect the flow path 142 and the outside of the device 101.

In the embodiment shown in FIGS. 1A to 1C, the sample liquid is introduced and collected from a direction substantially perpendicular to the flat surface of the substrate 102 of the device 101, but the aspect of the sample introduction hole and the sample collection hole is not limited to this, and the device 101 may have other positions, directions, and shapes.

For example, the sample input hole and the sample collection hole may be arranged substantially parallel to the flat surface of the substrate.

Figure 2:
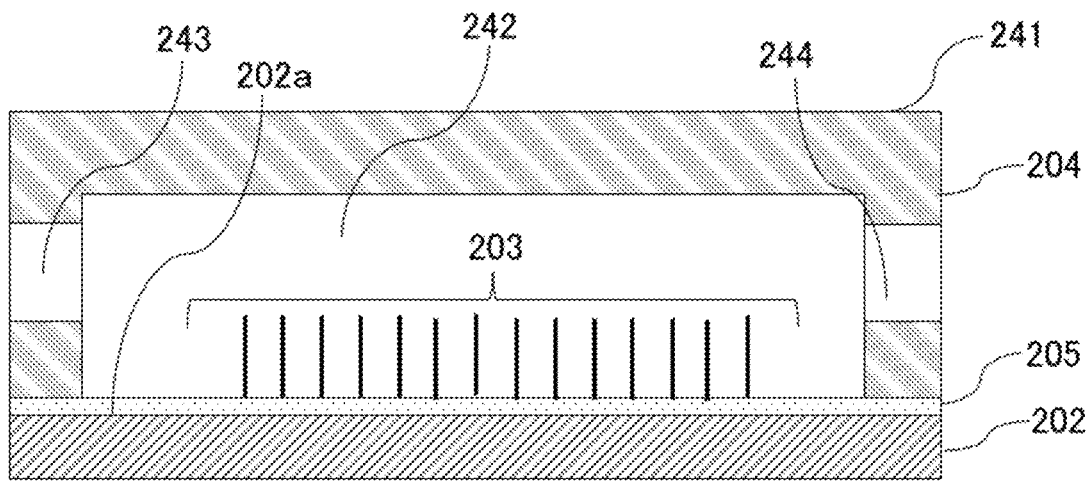
FIG. 2 is a cross-sectional view describing a fluid device according to an embodiment.

In device 201 shown in FIG. 2, a catalyst layer 205 is formed on a flat surface 202a of a substrate 202, and nanowires 203 are formed thereon.

A cover 204 is bonded to the substrate 202, and a space of a flow path 242 is defined.

In the device 201 shown in FIG. 2, the sample input hole 243 and the sample collection hole 244 are formed in the side wall of the cover 204 in a direction substantially parallel to the flat surface 202a of the substrate 202.

<Nanowire Formation 1>

Examples of methods for forming nanowires using catalysts as shown in FIGS. 1A to 1C and FIG. 2 will be described with reference to FIGS. 3A to 3E.

Figure 3A:
FIG. 3A is a cross-sectional view illustrating a process of manufacturing a nanowire substrate according to an embodiment.

First, the substrate 302 is prepared (FIG. 3A).

Figure 3B:
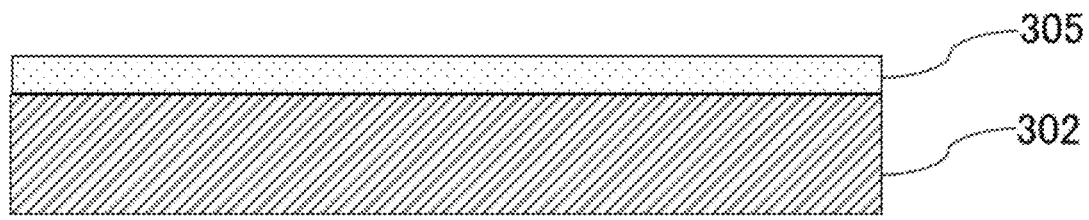
FIG. 3B is a cross-sectional view illustrating a process of manufacturing a nanowire substrate according to an embodiment.

Catalyst layers 305 are formed on the substrates 302 by depositing a material (a catalyst material or a material forming a microstructure as a starting point of growth) serving as a starting point of growth of the nanowires 303 (FIG. 3B).

The deposition methods may be ECR (Electron Cyclotron Resonance) sputtering or ECR sputtering of catalysts, EB (Electron Beam) deposition, PLD (Pulsed Laser Deposition), ALD (Atomic Layer Deposition).

A resist 306 for photolithography is coated on the catalyst layer 305.

Figure 3C:
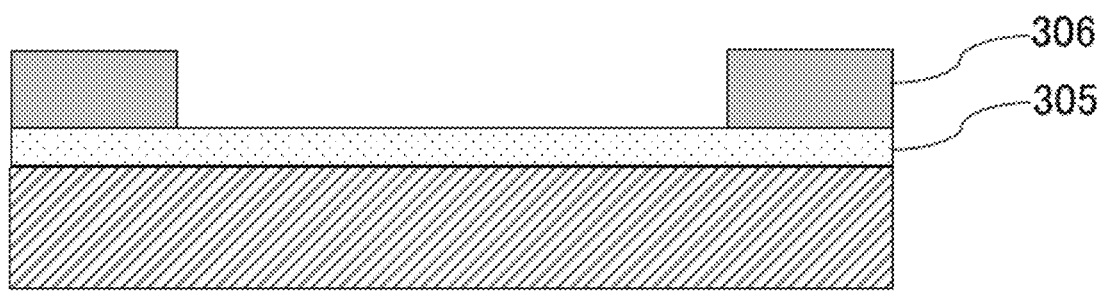
FIG. 3C is a cross-sectional view illustrating a process of manufacturing a nanowire substrate according to an embodiment.

Locations where nanowires 303 are to be grown are patterned to remove resists 306 and expose catalytic layers 305 (FIG. 3C).

Figure 3D:
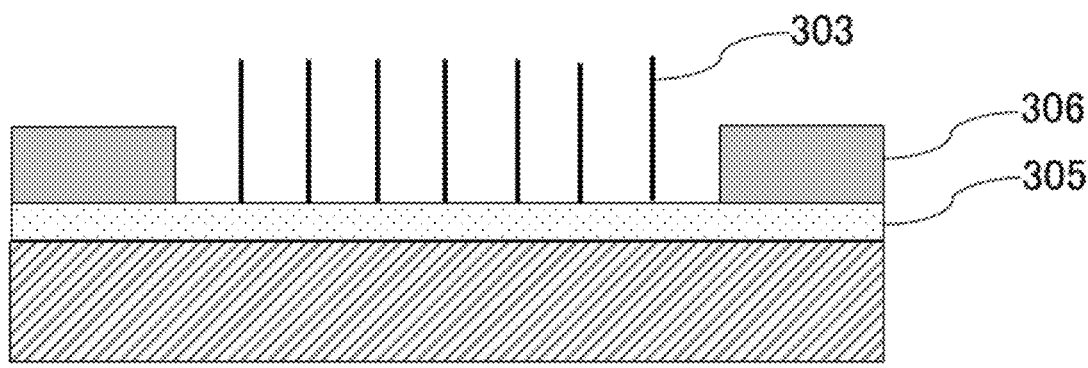
FIG. 3D is a cross-sectional view illustrating a process of manufacturing a nanowire substrate according to an embodiment.

Nanowires 303 are grown where the resist is removed and catalytic layers 305 are exposed, as shown in FIG. 3D.

Figure 3E:
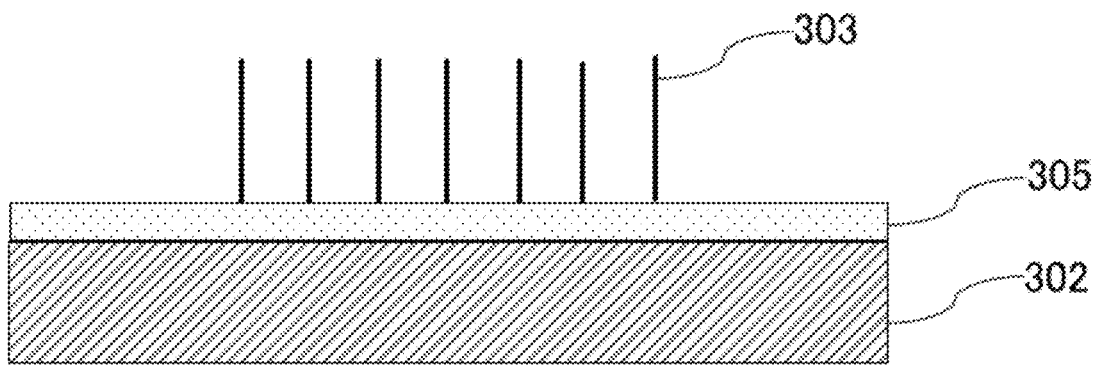
FIG. 3E is a cross-sectional view illustrating a process of manufacturing a nanowire substrate according to an embodiment.

By removing the remaining resist, nanowires 303 are formed on the catalytic layers 305 of the substrates 302 (FIG. 3E).

There are no particular restrictions on photolithography resists as long as they are commonly used in the field of semiconductors, such as OFPR8600LB, SU-8.

The removing solution of the resist is not particularly limited as long as it is a removing solution common in the semiconductor field, such as dimethylformamide and acetone.

In the case where a catalyst is used as the catalyst layer 305, the nanowires 303 can be produced in the next step.

(a) Core nanowires are formed by a physical vapor deposition method such as a pulsed laser deposition method or a VLS (Vapor-Liquid-Solid) method using materials such as $SiO_2$, $Li_2O$, $MgO$, $Al_2O_3$, $CaO$, $TiO_2$, $Mn_2O_3$, $Fe_2O_3$, $CoO$, $NiO$, $CuO$, $ZnO$, $Ga_2O_3$, $SrO$, $In_2O_3$, $SnO_2$, $Sm_2O_3$, and $EuO$.

(b) Coating layers are formed around the core nanowires by a common deposition method such as sputtering, EB (Electron Beam) deposition, PVD (Physical Vapor Deposition), ALD (Atomic Layer Deposition), or the like using $SiO_2$, $TiO_2$ or the like.

The coating layer of (b) is not essential, and may be implemented as necessary.

The nanowire growth method may be employed not only in the present embodiment but also in other embodiments.

The diameter of the nanowire 303 may be appropriately adjusted according to the purpose.

When ZnO fine particles are used, the diameter of the nanowire 303 can be appropriately adjusted by changing the size of the ZnO fine particles.

When a coating layer is formed on the produced nanowire 3, the diameter of the nanowire can be appropriately adjusted by changing the deposition time for forming the coating layer.

The method of adjusting the diameter of the nanowire may be employed not only in the present embodiment but also in other embodiments.

By photolithography patterning, the position at which the nanowire is formed, the shape, the area, the number, the density, the interval, and the like of the nanowire can be controlled.

For example, as shown in FIG. 3D, when all of the catalytic layers 305 in the region of the substrate 302 where the nanowires 303 are formed are exposed, the nanowires 303 can be randomly grown in the region of the substrate 302.

On the other hand, in some embodiments, the region may be subdivided to define and form a plurality of regions on the substrate.

Figure 4C:
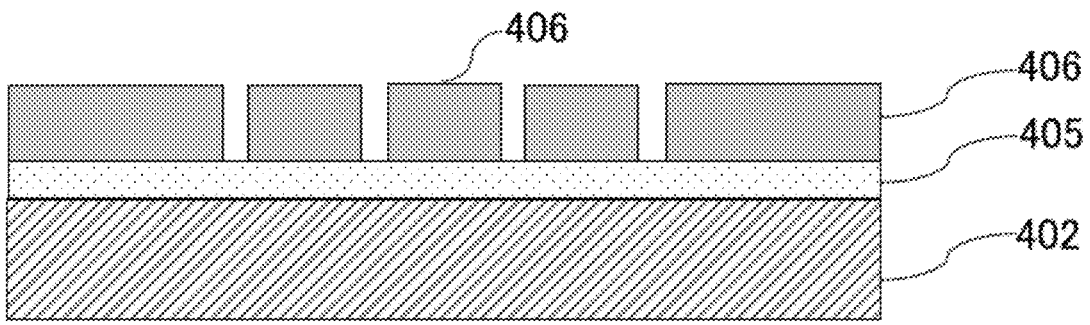
FIG. 4C is a cross-sectional view illustrating a process of manufacturing a nanowire substrate according to an embodiment.
Figure 4D:
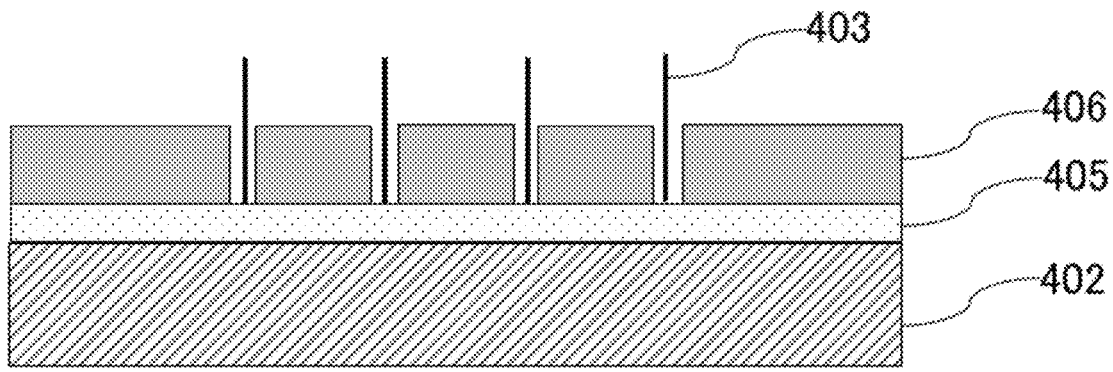
FIG. 4D is a cross-sectional view illustrating a process of manufacturing a nanowire substrate according to an embodiment.
Figure 4E:
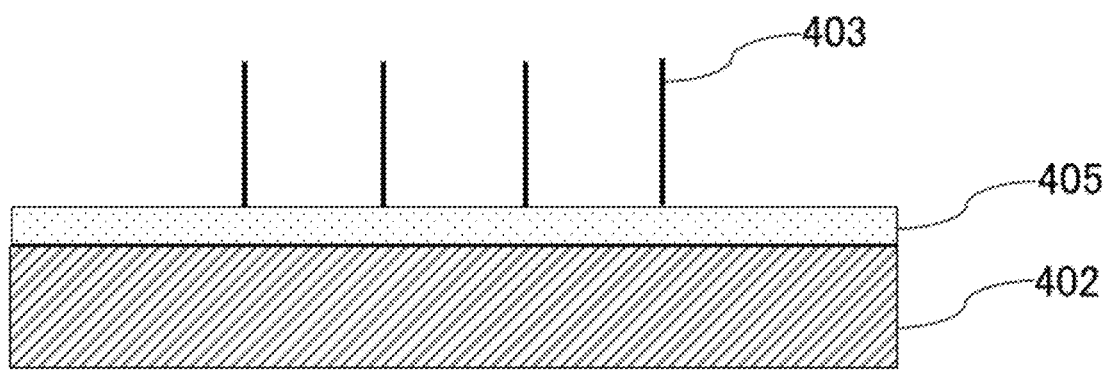
FIG. 4E is a cross-sectional view illustrating a process of manufacturing a nanowire substrate according to an embodiment.

For example, as shown in FIGS. 4C to 4E, the catalytic layers 405 may be exposed in the form of dots, and the nanowires 403 may be formed on the catalytic layers 405.

A catalyst layer 405 is formed on the substrate 402 in the same manner as in FIG. 3A to FIG. 3B. A photoresist 406 is coated on the substrate 402, patterned by photolithography, and only predetermined portions of the photoresist 406 are removed in dots to expose the catalyst layer 405 (FIG. 4D).

Nanowires 403 are grown where the resist 406 is removed and the catalytic layers 405 are exposed (FIG. 4D)

By removing the remaining resist 406, nanowires 403 are formed in dots at predetermined positions on the catalytic layers 405 of the substrates 402 (FIG. 4E).

<Manufacture of Cover>

Figure 5:
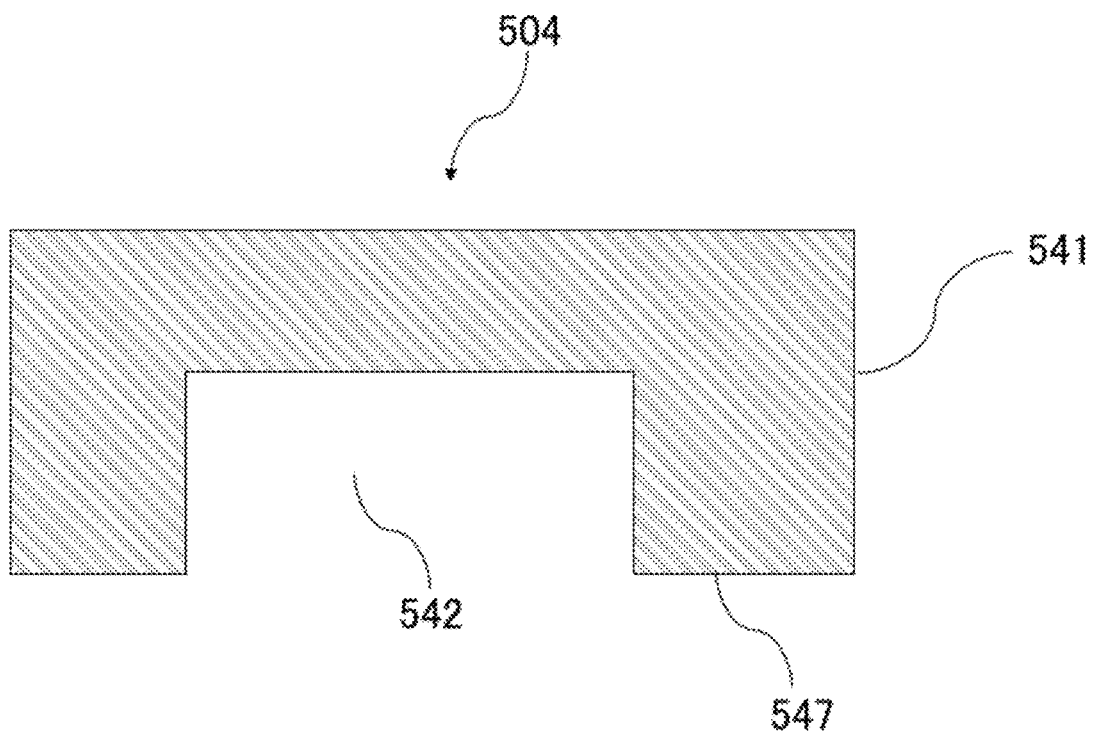
FIG. 5 is a cross-sectional view describing a cover according to an embodiment.

FIG. 5 shows a cross section of the cover 504.

In some embodiments, the recess or fluid channel 542 of the cover 504 may be formed by cutting the second surface 547 of the cover member substrate 541.

In some embodiments, the recess or channel 542 of the cover 504 may be formed by pressing a convex mold against the material of the cover member substrate 541.

When the cover 504 is manufactured by pressing a convex mold, the sample input hole and the sample collection hole may be formed by using a biopsy trepan, an ultrasonic drill, or the like after transfer. (not shown in figures)

The shape of the cover 504 can vary depending on, for example, but not limited to, the cutting range and the shape of the mold.

Figure 6:
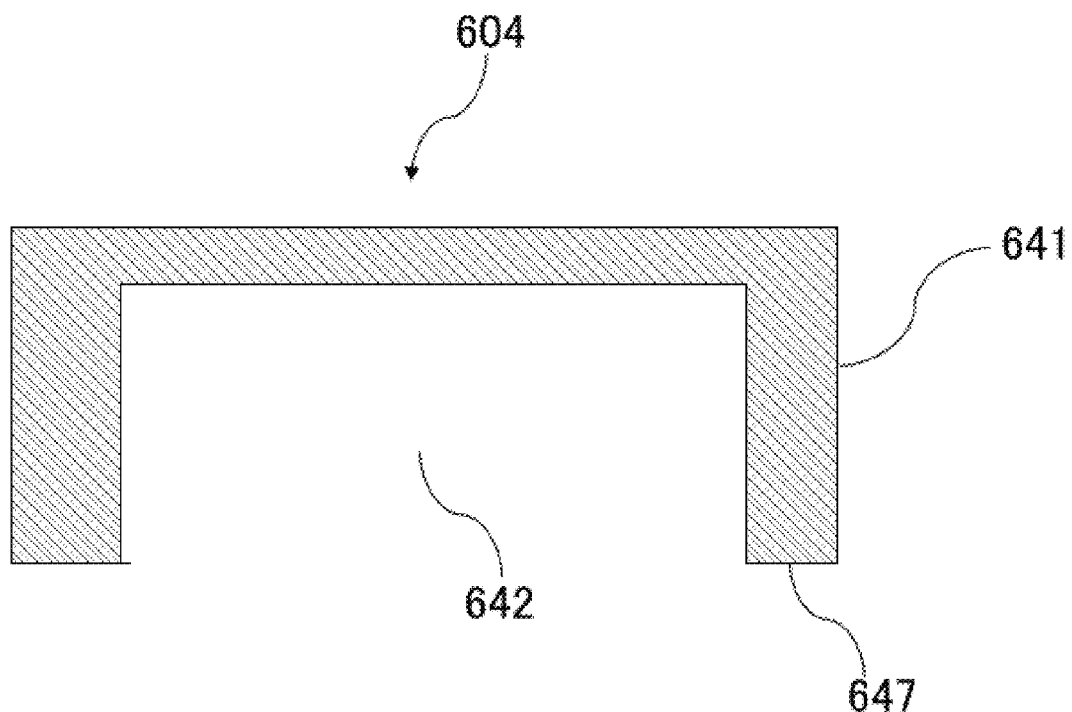
FIG. 6 is a cross-sectional view describing a cover according to an embodiment.

In the cover 604 shown in FIG. 6, the flow path portion 642 is formed wider and deeper than the cover 504 shown in FIG. 5, that is, the thickness of the inner wall facing the side wall or the substrate of the cover member base material 641 is reduced.

In this manner, the shape and position of the flow path portion (concave portion) on the cover side can be changed relatively easily, and can be manufactured independently of the formation mode of the nanowires of the substrate.

In some embodiments, some or all of the flow paths may be configured to create turbulence in the passing solution.

Figure 7:
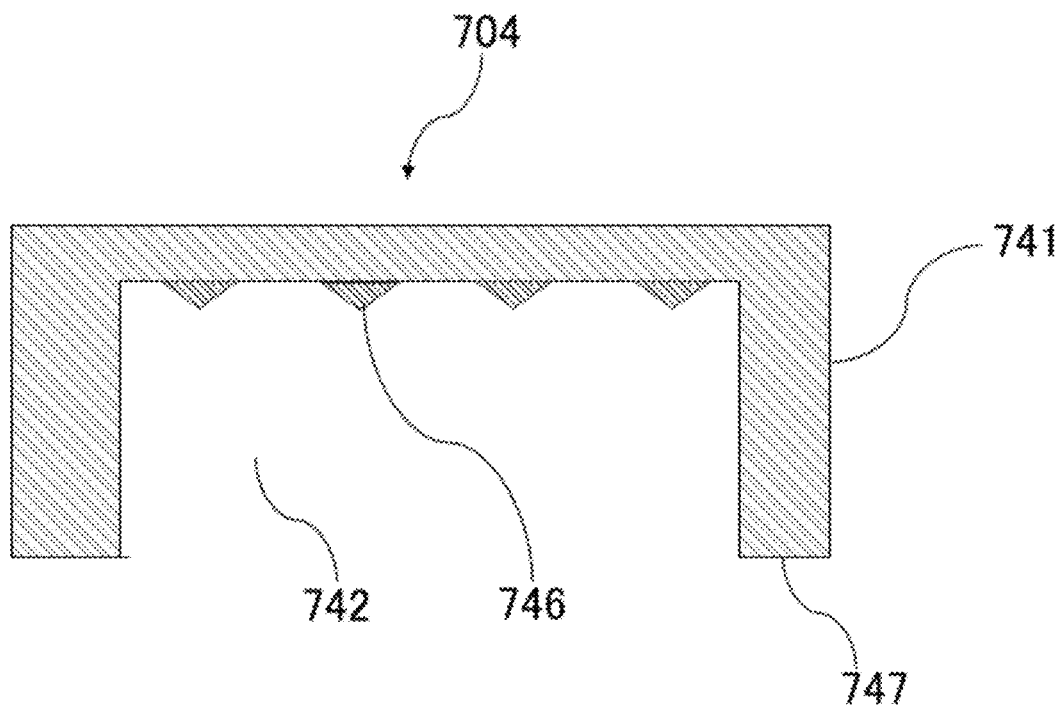
FIG. 7 is a cross-sectional view describing a cover according to an embodiment.

For example, as shown in FIG. 7, a non-planar region 746 for agitating the passing sample liquid may be formed on the inner wall of the flow path 742, which in FIG. 7 is the inner wall facing the flat surface of the substrate.

The non-planar region 746 may form, for example, a convex portion or the like.

A plurality of types of covers 704 having different cross-sectional areas and shapes of the flow path portion 742 can be prepared.

The three-dimensional microstructure of the non-planar region 746 may function as a chaotic mixer.

The non-planar region 746 may be formed as, for example without limitation, a convex portion or the like, may be formed as a concave shape, or may be formed as a concavo-convex structure.

<Bonding of Substrate and Cover>

The substrate on which the nanowires are formed is covered and bonded so that the nanowires enter the flow path and the bonding surfaces of the nanowires are in close contact with each other.

As an example, the substrate 302 on which the nanowires are grown in the process shown in FIGS. 3A to 3E is bonded to the cover 504 shown in FIG. 5, in which the sample insertion port and the sample collection hole have been formed, and the device 101 shown in FIGS. 1A to 1C can be manufactured.

Forming a flow path portion defining a flow path or a surface structure for agitating a fluid on a substrate on which nanowires are to be formed or are formed may complicate or make a manufacturing process difficult.

On the other hand, the degree of freedom of design and manufacturing can be remarkably improved by forming a flow path portion defining a flow path and a surface structure for agitating a fluid in a cover which is a member independent of a substrate having nanowires.

The flow path of the cover member may be designed or manufactured substantially independently of the substrate so as to have a desired size, shape (e.g., cross-sectional area, cross-sectional shape, longitudinal length, shape, etc.), surface shape(s).

As a result, a device having a flow path with desired characteristics can be manufactured according to the type of the sample.

Thus, for example and without limitation, a device having a flow path of a desired characteristic can be fabricated, depending on the type of sample.

In some embodiments, a non-planar region may be formed in the substrate (not shown in figures).

The sample passing through the flow path can be agitated without substantially impairing the flatness of the substrate.

A substrate of the present disclosure has a substantially flat nanowire surface.

For example, a flow path is not formed in the substrate.

Therefore, when a planar substrate is used, the catalyst layer formed on the substrate is also planar, in other words, has a structure without a step.

Therefore, as shown in FIGS. 5, 6, and 7, the second surfaces 547, 647, and 747 of the cover member base materials 541, 641, and 741 are also planar.

As a result, the substrate on which the nanowires are formed and the cover member can be brought into close contact with each other in a liquid-tight manner.

If necessary, an adhesive or the like may be used to adhere or adhere the catalyst layer to the second surface of the cover.

The above configuration is not limited to the present embodiment, and may be similarly adopted in some embodiments.

For example, as shown in FIGS. 3B to 3E, in some embodiments, catalytic layers may be disposed, formed, or laminated on the substrates.

The catalyst layer may function physically or chemically as a catalyst for the growth of the nanowires.

The catalyst layer may not physically or chemically function as a catalyst for the growth of the nanowires, e.g. may function as a nucleus or origin of growth.

In some embodiments, the catalyst layer may not be disposed on the substrate.

Nanowires may be formed directly on the substrate.

One end of the nanowire may be embedded in the substrate.

Referring to FIGS. 8A to 8D, a device 801 according to the second embodiment will be described.

Figure 8A:
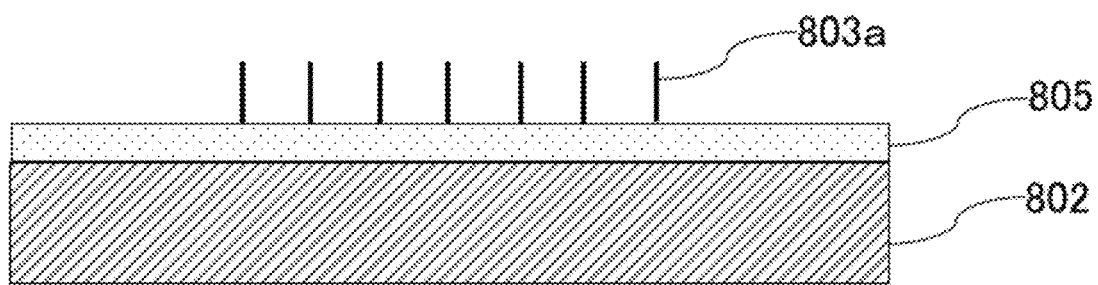
FIG. 8A is a cross-sectional view illustrating a process of making a fluidic device according to an embodiment.
Figure 8B:
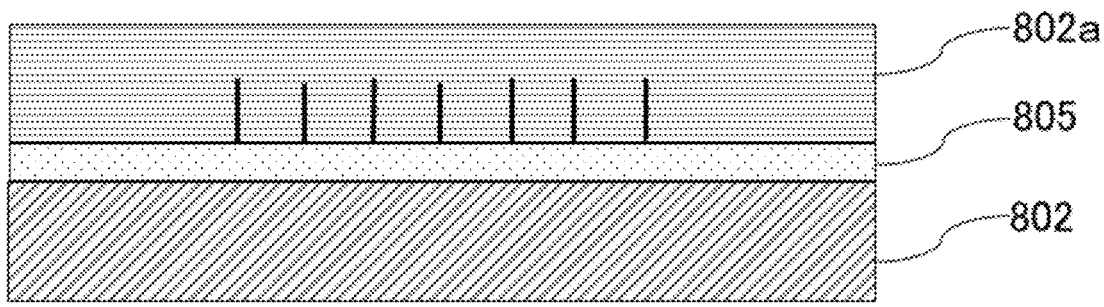
FIG. 8B is a cross-sectional view illustrating a process of making a fluidic device according to an embodiment.
Figure 8C:
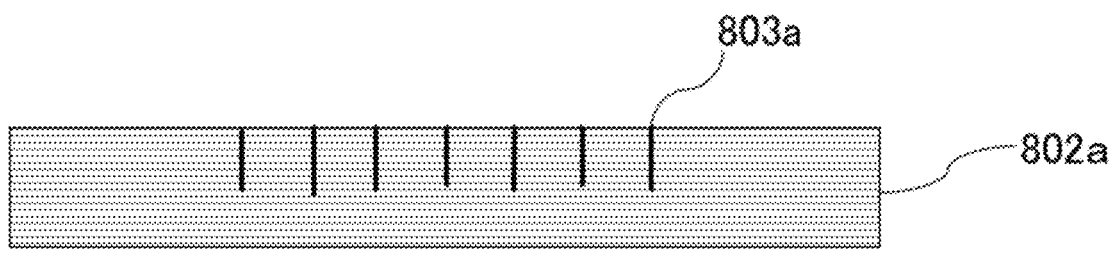
FIG. 8C is a side view describing a process of making a fluidic device according to an embodiment.
Figure 8D:
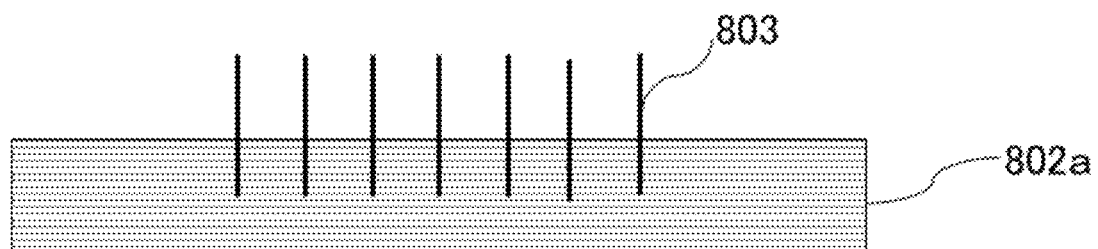
FIG. 8D is a cross-sectional view illustrating a process of making a fluidic device according to an embodiment.
Figure 8E:
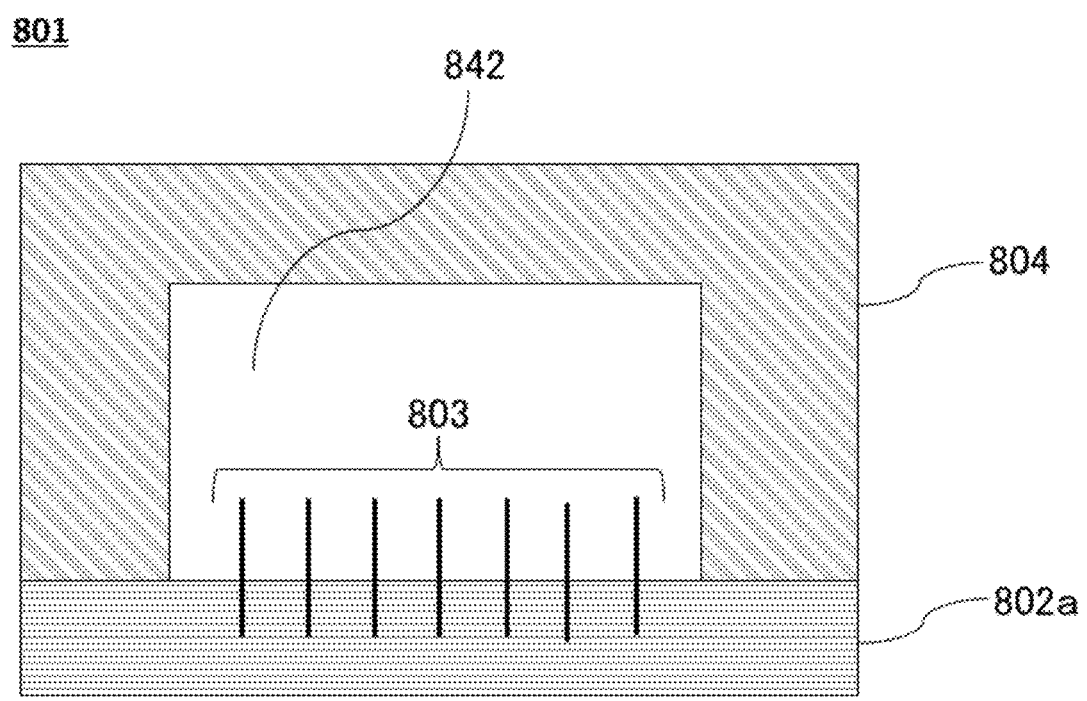
FIG. 8E is a cross-sectional view illustrating a process of making a fluidic device according to an embodiment.

FIG. 8E shows a cross-sectional view of the 1b of devices according to the second embodiment, in the same orientation as the view shown in FIG. 1B.

In the device 801 according to the second embodiment, the end portion of the nanowire is buried in the first surface of the substrate without using the catalyst layer.

First, a catalytic layer 805 is formed on a temporary substrate 802 by a process similar to that in FIGS. 3A to 3E, and nanowires 803a are is formed on the catalytic layer 805 (FIG. 8A).

On the temporary substrate 802, a liquid for wrapping and fixing the nanowires 803a is applied and cured.

The substrate 802*a* is a substrate in which the nanowires 803*a* are embedded and cured (FIG. 8B).

The temporary substrate 802 is peeled off from the cured substrate 802*a* together with the catalyst layer 805.

As a result, a substrate 802*a* in which one end of the embedded nanowires 803 is exposed on a flat surface is manufactured (FIG. 8C).

The nanowire 803 is further grown from one end of the exposed nanowire 803 as a starting point.

In this manner, the nanowires 803 can eventually form nanowires 803 whose ends are embedded in the first surface (flat surface) of the substrate 802*a* and whose remaining portions protrude from the substrate 802*a* (FIG. 8D).

By covering the substrate 802*a* with the cover 804, a device 801 in which a flow path 842 for accommodating the nanowires 803 therein is defined can be manufactured (FIG. 8E).

The device 801 according to the second embodiment is highly mechanically stable or durable to a force applied laterally to the nanowire 803 by the liquid flowing through the flow path due to a structure in which one end of the device 801 is stuck in the substrate 802*a*.

Thus, for example, even if the flow rate of the sample liquid is increased, the nanowires 803 are hardly peeled off from the substrate 802*a*.

In some embodiments, nanowires may also be placed or grown on the interface with the cover of the substrate.

Third Embodiment

Figure 9:
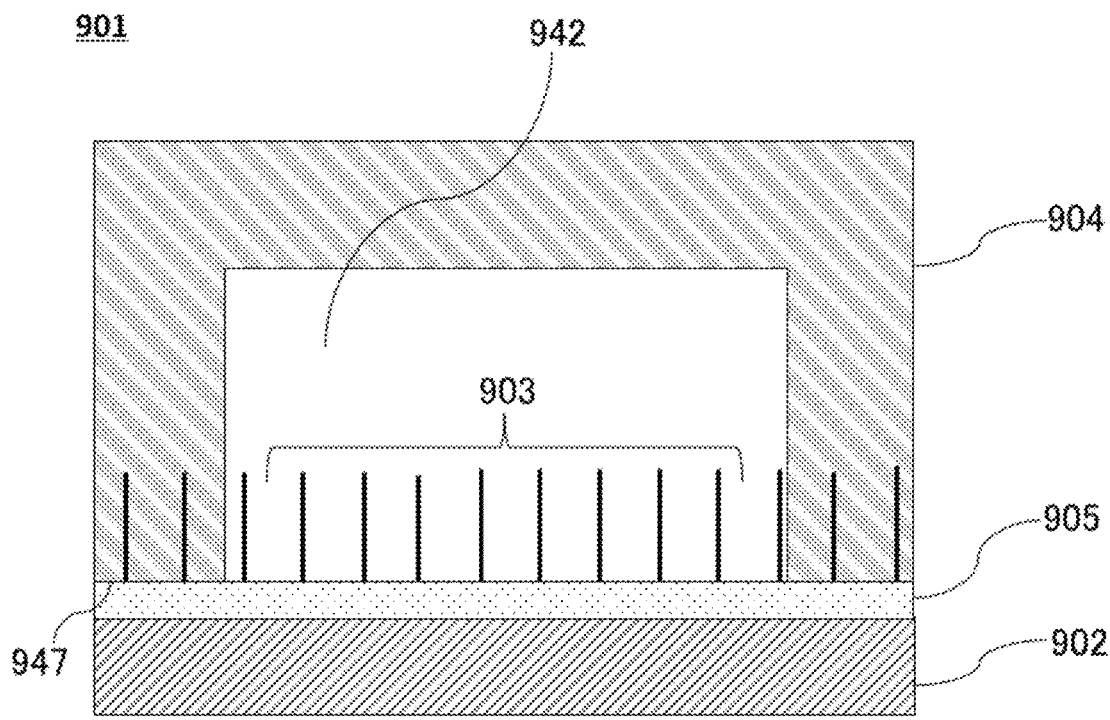
FIG. 9 is a cross-sectional view describing a fluid device according to an embodiment.

FIG. 9 shows a cross-sectional view of a non-implantable device 901 according to the third embodiment, the device 901 being oriented in the same direction as the direction shown in FIG. 1B.

A catalyst layer 905 is formed on a substrate 902, and nanowires 903 are formed thereon. A cover 904 is bonded to the substrate 902, and a flow path 942 is defined therein to accommodate a portion of the nanowires 903.

In the device 901 according to the third embodiment, the nanowires 903 are formed on the entire surface of the catalyst layer 905.

In order to form the nanowires 903 on the entire surface of the catalytic layer 905, for example, the process of applying and removing the resist as shown in FIGS. 3C and 3D may not be performed among the processes shown in FIGS. 3A to 3E in the first embodiment.

That is, the nanowires 903 are also formed on the bonding surface of the substrate 902, i.e., the surface of the catalyst layer 905, so that the tips of the nanowires 903 enter the second surface 947 of the cover 904.

Since the device 901 according to the third embodiment does not define the formation region of the nanowires 903 on the substrate 902, exemplarily, the design of the flow path 942 becomes flexible, and the manufacturing process of the nanowires 903 becomes simple.

Fourth Embodiment

Figure 10:
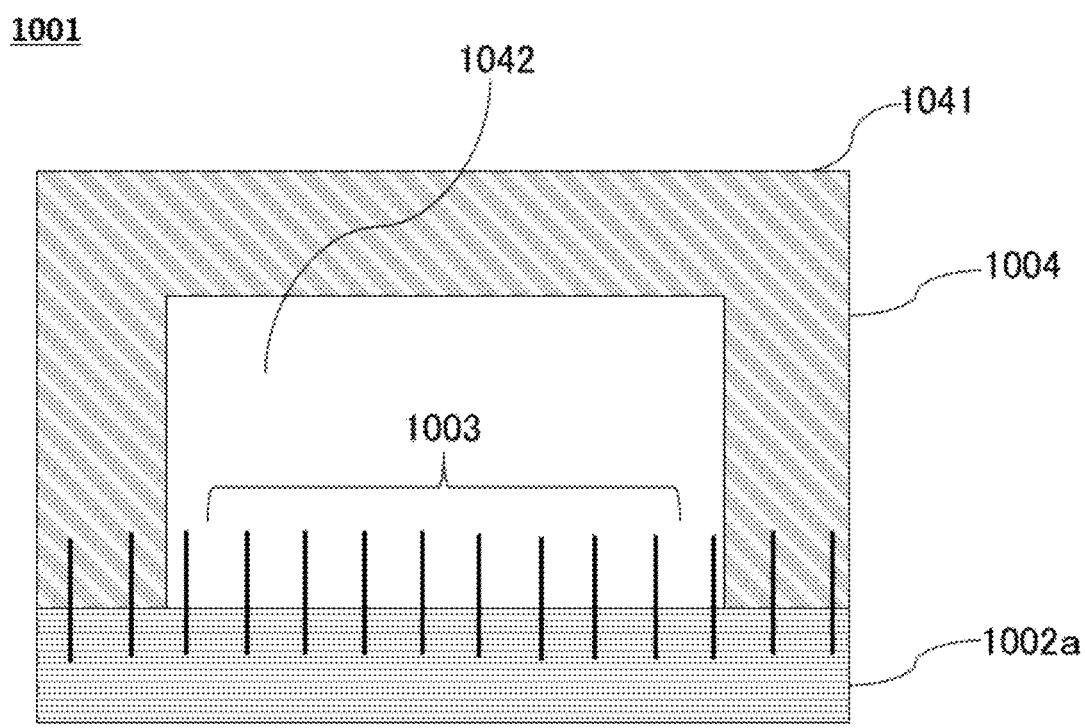
FIG. 10 is a cross-sectional view describing a fluidic device according to an embodiment.

FIG. 10 shows a cross-sectional view of an implantable device 1001 according to the fourth embodiment, in the same orientation as the view shown in FIG. 1B.

A nanowire 1003 having one end embedded in the substrate 1002 is formed on the substrate 1002.

A cover 1004 is bonded to the substrate 1002, and a flow path 1042 is defined therein to accommodate a portion of the nanowires 1003.

In the device 1001 according to the fourth embodiment, the catalyst layer is not included, and the ends of the nanowires 1003 are buried in the first surface (flat surface) of the substrate 1002*a*.

The substrate 1002*a* in which the end portions of the nanowires 1003 of the devices 1001 are buried in the first surface may be manufactured in the same manner as in FIG. 8B to FIG. 8E, after the substrate 1002*a* in which the nanowires are formed on the entire surface of the catalytic layers, which is manufactured in the third embodiment, is used as a substrate (see FIG. 8).

In the device 1001 according to the fourth embodiment, for example, in addition to the effect of the device 901 according to the third embodiment, since the end portion of the nanowire 1003 is embedded in the first surface of the substrate 1002*a*, even if the flow rate of the sample liquid is increased, the nanowire 1003 is hardly peeled off from the substrate 1002*a*.

As shown in the third and fourth embodiments, when the growth mode of the nanowires is defined by the substrate and the shape of the flow path is defined by the cover, the degree of freedom in the design of the flow path is greatly improved.

Figure 11:
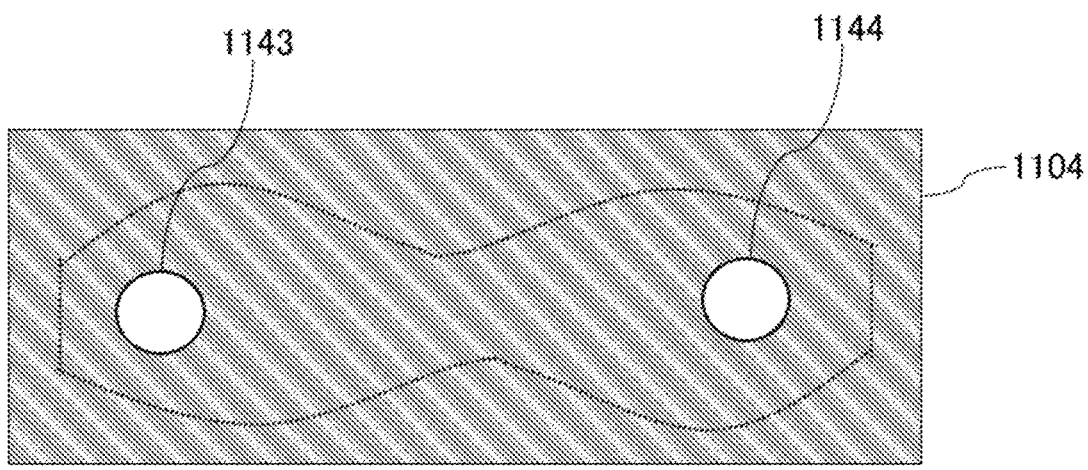
FIG. 11 is a top view describing a fluidic device according to an embodiment.

For example, as shown in FIG. 11, since the flow channel 1142, the sample input hole 1143, and the sample collection hole 1144 are defined in the cover 1104, they can be relatively freely designed independently of the growth position of the nanowires on the substrate.

Fifth Embodiment

FIGS. 12A to 12F show cross-sectional views illustrating a manufacturing process of the non-implantable device 1201 according to the fifth embodiment, which are the same directions as those illustrated in FIG. 1B.

Figure 12A:
FIG. 12A is a cross-sectional view illustrating a process of making a fluid device according to an embodiment.
Figure 12B:
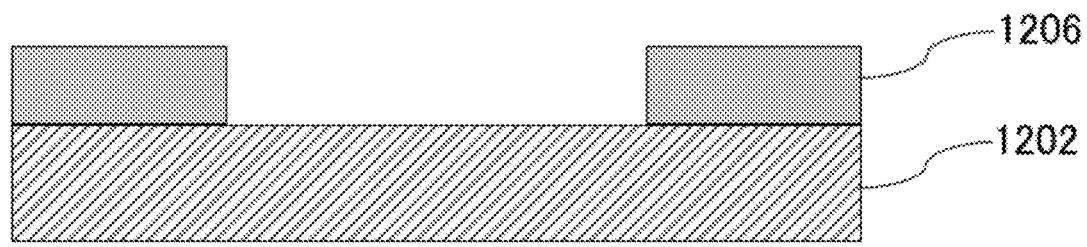
FIG. 12B is a cross-sectional view illustrating a process of manufacturing a fluid device according to an embodiment.
Figure 12C:
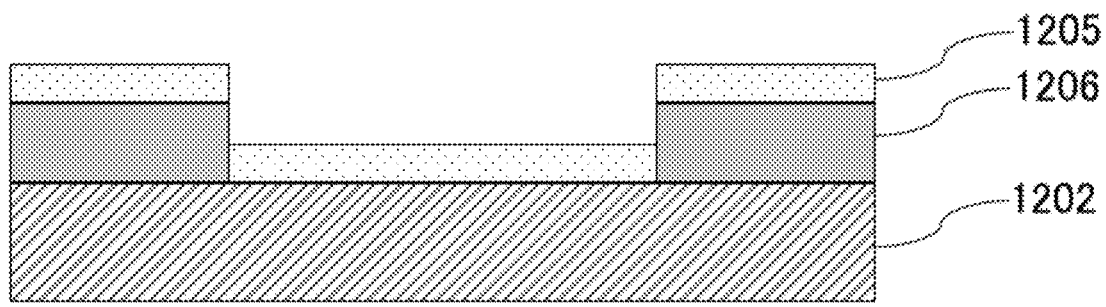
FIG. 12C is a cross-sectional view illustrating a process of manufacturing a fluid device according to an embodiment.
Figure 12D:
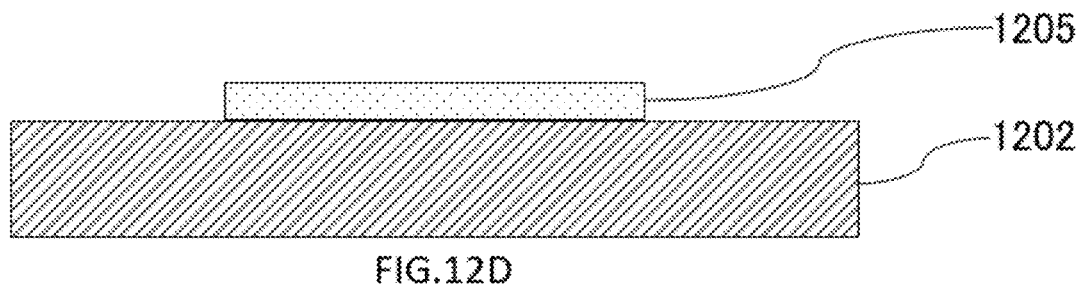
FIG. 12D is a cross-sectional view illustrating a manufacturing process of a fluid device according to an embodiment.
Figure 12E:
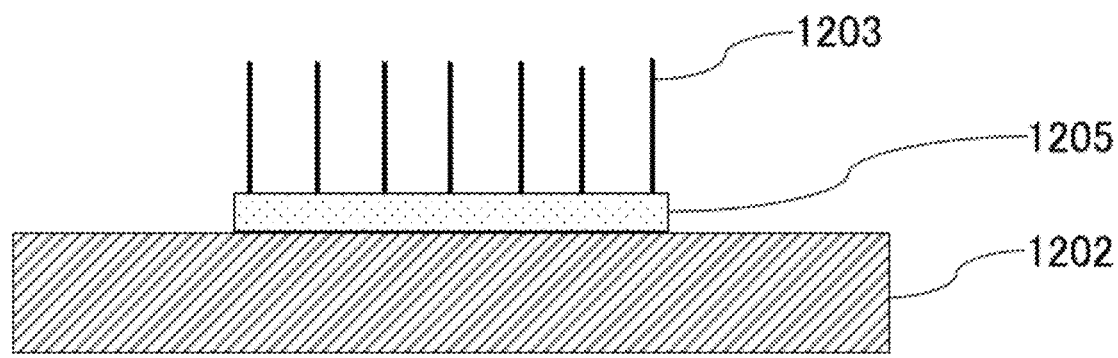
FIG. 12E is a cross-sectional view illustrating a process of manufacturing a fluid device according to an embodiment.
Figure 12F:
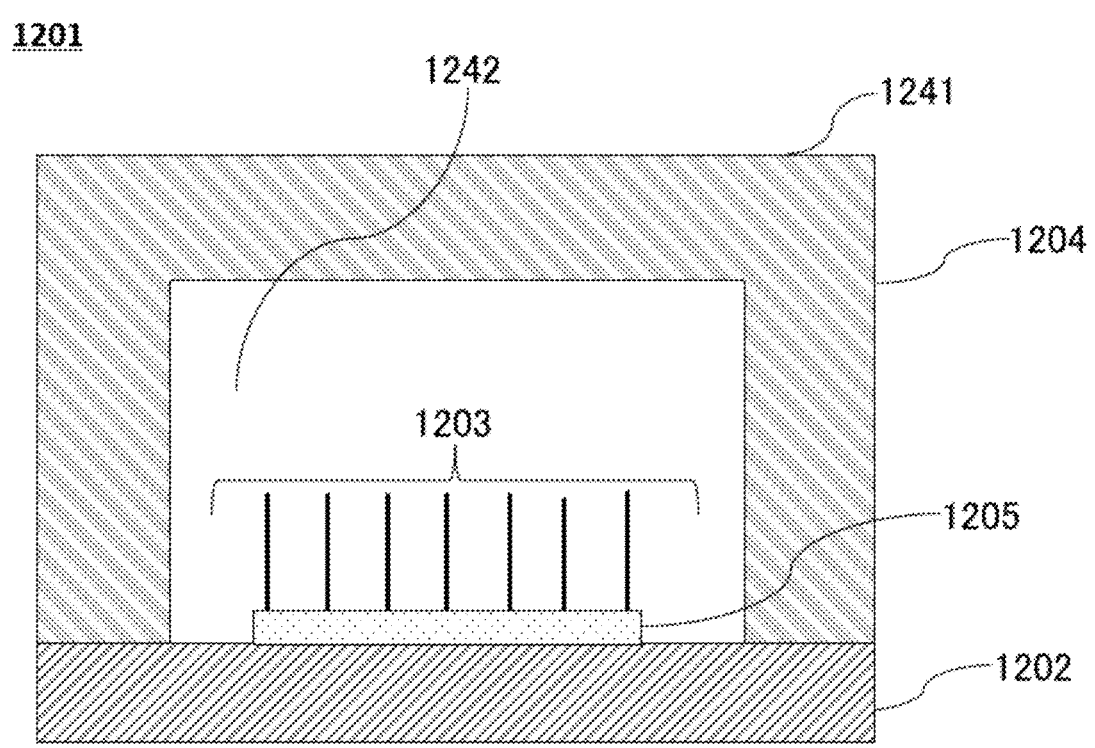
FIG. 12F is a cross-sectional view illustrating a process of making a fluid device according to an embodiment.

As shown in FIG. 12F, in the device 1201 according to the fifth embodiment, the catalyst layer 1205 is formed on a part of the substrate 1202, and the second surface 1247 of the cover 1204 directly adheres to the first surface of the substrate 1202 instead of the catalyst layer 1205.

An example of a manufacturing process of the device 1201 according to the fifth embodiment will be described with reference to FIGS. 12A to 12F.

First, a substrate 1202 is prepared (FIG. 12A).

A resist 1206 is applied to the substrate 1202, and pattern development is performed so that the resist 1206 remains in a portion where the catalyst layer 1205 is not formed (FIG. 12B).

On the substrate 1202 on which the above-described resist 1206 is formed, the catalyst layer 1205 is formed by ECR sputtering of a material serving as a nucleus for growing the nanowire 1203, or by ECR sputtering, EB evaporation, PLD, and ALD of a catalyst (FIG. 12C).

The resist 1206 is removed (FIG. 12D).

A nanowire 1203 is grown on the exposed surface of the catalyst layer 1205 (FIG. 12E).

A cover 1204 is placed over and bonded to the substrate 1202 on which the nanowires 1203 are formed, thereby completing a device 1201 according to the fifth embodiment (FIG. 12F).

Sixth Embodiment

Figure 13:
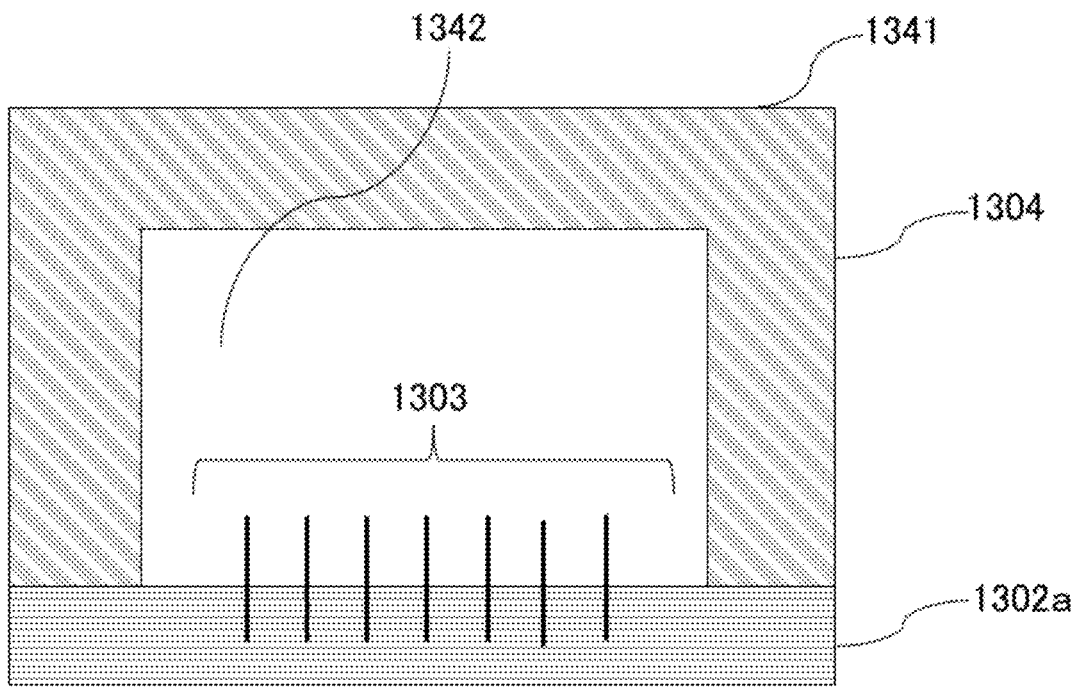
FIG. 13 is a cross-sectional view describing a fluidic device according to an embodiment.

FIG. 13 shows a cross-sectional view of an embedded-type device 1301 according to the sixth embodiment, the embedded-type device 1301 being in the same orientation as the view shown in FIG. 1B.

In the device 1301, the catalyst layer is not included, and the ends of the nanowires 1303 are embedded in the first surface (flat surface) of the substrate 1302*a*.

A cover 1304 is bonded to the substrate 1302*a* to form a flow path 1342 for accommodating the nanowires 1303.

The substrate 1302*a* in which the end portions of the nanowires 1303 of the devices 1301 are embedded in the first surface may be manufactured in the same manner as in FIG. 8B to FIG. 8E after using the substrate in which the nanowires are formed in a part of the catalytic layers (see FIG. 12E) manufactured in the fifth embodiment as the substrate of FIG. 8A.

The device 1301 according to the sixth embodiment, for example, has high mechanical stability or durability against a force applied laterally to the nanowire 1303 by the liquid flowing through the flow path 1342 due to a structure in which one end of the device 1301 pierces the substrate 1302*a*.

Thus, for example, even if the flow rate of the sample liquid is increased, the nanowires 1303 are hardly peeled off from the substrate 1302*a*.

In some embodiments, the nanowires may be fixed to the substrate.

The fixing of the nanowires to the substrate may, for example and without limitation, be performed by embedding a part of the nanowires in the substrate as shown in FIGS. 8E, 10 and 13.

In some embodiments, the growth nuclei or growth origins of the nanowires may be fixed to the substrate.

Nanowires may be grown from the growth nucleus or growth origin.

In some embodiments, the growth origin may be a portion of nanowires embedded in the substrates, as shown in FIGS. 8E, 10 and 13.

After nanowires are grown using the same or different materials, it results in a structure in which the nanowires are partially embedded in the substrate.

In some embodiments, the growth nuclei of the nanowires may be fixed to the substrate.

A substrate including growth nuclei may be created and nanowires grown on the growth nuclei disposed on the substrate surface.

Figure 18:
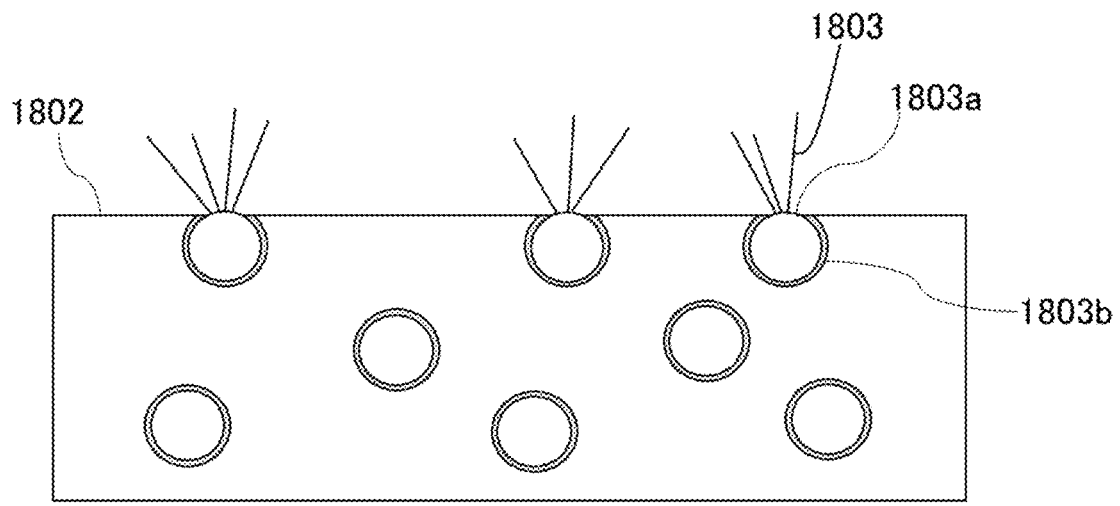
FIG. 18 is a cross-sectional view describing an embodiment of nanowires fixed on a substrate.

In one embodiment, as shown in FIG. 18, nanowire growth nuclei 1803*a* may be incorporated into the substrate 1802.

The growth nucleus 1803*a* may be coated with an adhesive 1803*b* to enhance bonding strength with the substrate 1082.

An adhesive may be mixed with the substrate 1082 to enhance the bonding strength of the growth nucleus 1803*a* to the substrate.

Growth nuclei partially exposed are disposed on the surface of the substrate 1802.

For example, growth nuclei may be mixed with a liquid substrate material and the mixture is solidified to form a substrate 1802 including growth nuclei 1803*a*.

The substrate surface may be polished.

Polishing can remove unwanted materials, such as, but not limited to, impurities on the surface of growth nuclei on the substrate surface to form a surface that is susceptible to growth.

For example, and without limitation, the adhesive coating layer on the growth nucleus surface can be removed.

Nanowires 1803 may be formed on the surface of the exposed growth nuclei 1803*a*.

Figure 19:
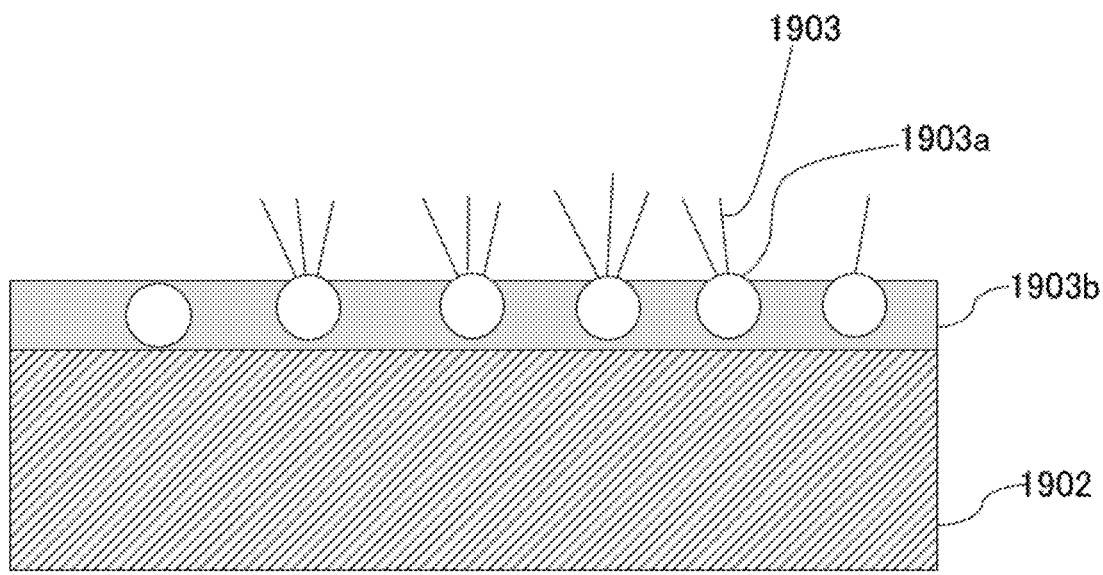
FIG. 19 is a cross-sectional view describing an embodiment of nanowires fixed on a substrate.

As a further embodiment, as shown in FIG. 19, a growth nucleus 1903*a* is coated on a substrate 1902, and an adhesive layer 1903*b* is formed to fix the growth nucleus 1903*a* to the substrate 1902.

For example, the growth nucleus 1903*a* may be mixed with the liquid adhesive 1903*b*, and the mixture may be coated on the substrate 1902 and fixed.

The substrate surface may be polished.

Polishing can remove unwanted materials, such as, but not limited to, impurities on the surface of growth nuclei on the substrate surface to form a surface that is susceptible to growth.

For example, without limitation, adhesive coating layers, adhesives, and the like on the growth nucleus surface can be removed.

Nanowires 1803 and 1903 may be formed on the surfaces of the exposed growth nuclei 1803*a* and 1903*a*.

The growth nuclei 1803*a* and 1903*a* may be single crystal particles, polycrystal particles, amorphous particles, or the like.

The material of the growth nuclei 1803*a*, 1903*b* and the nanowires 1803, 1903 may be, for example, without limitation, ZnO.

In one aspect, the biomolecules extracted by the devices described herein can be analyzed in about 1 minute to about 1 hour, about 10 minutes to about 24 hours, about 15 minutes to about 12 hours.

<Device Usage>

In some embodiments, a device according to the present disclosure can be used to separate extracellular vesicles contained therein from, for example, a solution derived from a bodily fluid.

Using a syringe pump or the like, a sample solution containing extracellular vesicles (e.g., culture medium, body fluid such as serum or urine) can be fed into the flow path from the sample input hole, and the solution after separation of the extracellular vesicles can be collected from the sample collection hole.

After the sample solution has been flushed, the extracellular vesicles adsorbed to the nanowires can be analyzed.

The surface of the nanowire may be positively charged.

Thus, for example, negatively charged extracellular vesicles can be efficiently collected. For example, the nanowires may be formed of a positively charged material such as ZnO, nickel oxide, or the like, or the nanowires may be coated such a material.

When the sample adsorbed on the nanowires of the device is observed with an optical microscope or an electron microscope, the cover may be peeled off from the substrate. When the catalyst layer (or the substrate) and the cover member are in close contact with each other with an adhesive or the like, the cover member may be cut with a knife or the like.

Microscopic observation can, for example, determine the size and number of captured samples.

Also, quantitative analysis of the surface protein of the captured sample can be performed, for example, by binding an optical label, such as a fluorescent label, to the sample.

The devices of the present disclosure can also be used to analyze captured biomolecules. For example, when nucleic acid is extracted from a sample selected from cells, viruses, and bacteria, a suspension in which the sample is suspended is put into a sample input hole.

Specific examples of cells, viruses, and bacteria include those having a cell membrane structure, and include bacteria such as staphylococcus, *Bacillus subtilis*, *E. coli*, *Salmonella*, *Pseudomonas aeruginosa*, *Cholera*, *Shigella*, *Bacillus*

*anthracis, tuberculosis, botulinum, tetanus*, and *Streptococcus*, and blood cells such as granulocytes, lymphocytes, reticulocytes, red blood cells, white blood cells, and platelets.

Viruses include noroviruses, rotaviruses, influenza viruses, adenoviruses, coronaviruses, measles viruses, rubella viruses, hepatitis viruses, herpes viruses, HIV, and the like. Examples of the bacteria include mushrooms, molds, yeasts, and the like, and specifically include *Tinea, Candida, Aspergillus, Saccharomyces cerevisiae*, and the like.

In addition to extracellular vesicles, samples include mitochondria and extracellular vesicles.

Analysis may include, for example and without limitation, optical analysis such as measurement of fluorescence intensity, mass spectrometry, immunoassays, immunostaining, etc., and may include chemical, biological, biochemical, physical or physicochemical processes such as fluorescent labeling, hybridization, radioisotope labeling, etc.

In some embodiments, an electric field may be applied to some or all of the regions of the nanowires.

For example, an electric field may be applied so that the sample input hole becomes negative and the sample collection hole becomes positive.

It is believed that the application of an electric field exerts an electrophoretic or electroosmotic force on the molecules of the sample.

It is believed that the application of an electric field increases the likelihood that molecules will be forced and fractured by the nanowires.

Nucleic acid and the like inside the crushed sample can be extracted from the crushed sample.

Fragmentation by electric field application has been demonstrated, at least in cells and bacteria.

At least a portion of the material, such as nucleic acid, therein can be extracted without adhering to the nanowires.

Nucleic acids and the like may move under an electric field or by electrical induction.

The isoelectric point of the material at the surface of the nanowire may be lower than the isoelectric point of the nucleic acid.

The isoelectric point of the material at the surface of the nanowire may be higher than the isoelectric point of the nucleic acid.

The isoelectric point of the material at the surface of the nanowire may be approximately the same as the isoelectric point of the nucleic acid.

If the isoelectric point of the material at the surface of the nanowire is lower than the isoelectric point of the nucleic acid, there may be cases where the rate of adhesion of the nucleic acid to the nanowire can be reduced.

For example, the nanowire surfaces may be coated with materials such as SiO2, TiO2.

The device 1 of the present disclosure can be incorporated into an analysis apparatus to configure the analysis apparatus.

In some embodiments, the device may be coupled to an external analysis device.

The connection may be a fluid connection.

In some embodiments, the device and another analysis unit may be coupled to form an analysis apparatus.

The analysis apparatus may include a separation/collection device and an analysis unit.

The biomolecule extracted by the device can also be analyzed quickly or efficiently as it is by using the analysis device in fluid communication with the device.

Furthermore, an analysis unit for analyzing the extracted biomolecules may be formed in the device 1.

In some embodiments, the device may include an analysis unit therein.

The device and the analysis unit may be fluidly connected.

In some embodiments, the analyzer, the analysis unit, and the analysis unit may be or include a sequencer.

The sequencer may be a DNA sequencer, an RNA sequencer, a peptide sequencer, a general purpose sequencer, a chromatography column, a mass spectrometer, or a combination thereof, or a versatile sequencer.

In some embodiments, the analyzer, analysis unit, and analysis section may be or include a microarray.

The microarray may be a DNA microarray, an RNA microarray, a protein microarray, a cell microarray, a tissue microarray, a compound microarray, etc.

For example, when extracting nucleic acids using the device 1, the nucleic acids extracted from the sample elongate as they flow between the nanowires, (1) By forming the device 1 into a shape that can be incorporated into a known nucleic acid sequencer, extraction of nucleic acids and analysis of nucleic acid sequences can be performed by a single apparatus.

(2) The nucleic acid sequence can be analyzed by separately introducing the extended nucleic acid into a nucleic acid sequencer.

(3) By further forming an analysis unit such as an electrode for analyzing nucleic acid in the device 1, a new analysis apparatus capable of performing nucleic acid extraction and nucleic acid sequence analysis in one apparatus can be manufactured.

<Method for Separating and Collecting Biomolecules>

The present disclosure also provides methods of separating biomolecules using a device. A method of separating, collecting, or extracting biomolecules according to some embodiments comprises: providing a device comprising: a substrate; nanowires disposed on a surface, e.g., a planar surface, of the substrate; a cover having a recess configured to bond with the substrate to define a fluid chamber or flow path with the surface, e.g., the planar surface, of the substrate; and introducing a solution comprising the biomolecules into the device.

In some embodiments, the biomolecule may be a cell, a virus, or a bacterium.

The method of separating, collecting, or extracting biomolecules may further comprise introducing a solution, such as a surfactant or a cell lysis solution, into the fluid chamber or flow path.

As a result, cells, viruses, bacteria, and the like captured by the nanowires can be dissolved and the biomolecules contained therein can be released into the solution.

The cell lysate may be lysis buffer.

Substances in the cells and the like are discharged into the fluid chamber by the cell lysis solution, and are discharged out of the device together with the flow of the lysis buffer.

This makes it possible to collect molecules, such as RNA, that were inside cells, such as extracellular vesicles, trapped by the nanowires.

The flow paths, the arrangement of the electrode wirings, and the arrangement of the nanowires are subject to restrictions due to each other.

In addition, arrangement and growth of nanostructures often undergo complex processes. Therefore, further restrictions on it lead to a complicated manufacturing process.

In some cases, the nanowire substrate has irregularities or unevenness (concavo-convex structure).

As an example, WO 2015/137427 discloses nanowires arranged on the bottom surface of a channel provided in a chip.

The height of the bonding surface of the substrate from the bottom surface of the flow channel is smaller than the height of the nanowires so that the cover can be bonded onto the flow channel.

Therefore, when observing a sample adsorbed to a nanowire by an optical microscope or an electron microscope, it is difficult to image a sample adsorbed to a deep position of the nanowire, that is, near the bottom of the flow path of the nanowire.

When the sample is imaged from the opening portion of the flow path by tilting the tip, the observation direction becomes oblique, and the side surface (wall surface) of the flow path obstructs the field of view, and it becomes difficult to image the sample captured by the nanowire in the vicinity of the bottom portion of the flow path and focus.

As another example, Japanese Patent Laid-Open No. 2017-158484 discloses a pair of electrodes for heating nanowires on a substrate.

The portion where the electrode is formed becomes higher than the portion where the electrode is not formed, and a step is generated.

If the electrode surface is covered with an insulating cover member in order to avoid leakage of the current supplied to the electrode into the sample liquid, the step is larger.

In contrast, nanowires can be fabricated separately from nanowire growth by fabricating nanowires on the flat surface of one substrate (the substrate) and fabricating macrostructures that essentially define flow paths on the other substrate (the cover). For example, because the surface of the substrate is flat, it provides advantages such as simplification of design and manufacture (e.g., lower requirements on the processing accuracy of the cover and the substrate for liquid-tight contact), efficiency, increased freedom, improved manufacturing regime, improved yield, and the like.

Extracellular vesicles contain biomolecules such as microRNA (micro ribonucleic acid: hereinafter sometimes referred to as "miRNA"), and proteins, which are novel biomarkers for diagnosing early-stage cancer and diseases.

The separation device of the present disclosure can be used to collect biomarkers such as, for example, but not limited to, nucleic acids and proteins with relatively low expression, even from relatively small amounts of solution.

Therefore, analysis of extracellular vesicle-derived miRNA can be used to effectively search for unknown biomarkers and carry out minimally invasive diagnoses.

In one aspect, the devices described herein can be used in methods for detecting a disease or disorder in a subject, individual, or patient.

In another aspect, the devices described herein detect cancer, e.g., early stage cancer. Depending on the particular application, the cancer may be any cancer that can be detected by the device, e.g., lung cancer, liver cancer, pancreatic cancer, colorectal cancer, cholecystic cancer, cervical cancer, bladder cancer, or prostate cancer.

In one aspect, a disease, such as cancer, can be identified or detected at about 1 minute to about 1 hour, about 10 minutes to about 24 hours, about 15 minutes to about 12 hours, about 30 minutes to about 6 hours.

In another embodiment, a sample volume of about 0.25 ml or less, about 0.5 ml, about 1 ml, about 2 ml, about 3 ml, about 4 ml, about 5 ml, about 10 ml, or less, or a sample volume of about 0.1 to about 5 ml, about 0.25 to about 3 ml, or about 0.5 to about 2 ml may be used in the devices described herein.

In another aspect, such a sample volume is an amount sufficient to separate and detect a biomolecule, such as RNA, to identify a disease or disorder, such as cancer.

In one aspect, the sample volume can yield an improved collection of less than or less than a volume such as 1 ml, 500 µl, 300 µl, 250 µl, 200 µl, 150 µl, 100 µl, 50 µl, 30 µl, 20 µl or 10 µl.

This volume is superior to standard centrifugation and other conventional separation techniques, which require a volume of at least 1 ml to 20 ml, etc.

In one embodiment, it may be a body fluid, such as collected urine, or a diluent thereof.

The devices described herein can produce improved yields of target biomolecules such as RNA, such as about 60%, about 70%, about 80%, about 90%, about 95%, about 99%, about 99.5%, about 99.9%, etc.

This yield is superior to standard centrifugation and other conventional separation techniques which provide only 5-25% collection rate.

In one embodiment, the devices described herein are assembled into a kit.

In one aspect, the kit may comprise, for example, an apparatus as described herein. Other materials such as buffers, reagents, test tubes, and instructions may be associated with the kit.

In one embodiment, the buffer may comprise a cell lysis buffer.

The following examples are provided to illustrate embodiments disclosed in the present application, but the examples are merely illustrative of embodiments.

It is not intended to be exhaustive or to limit the scope of the invention disclosed in this application.

EXAMPLES

Example 1

Device Fabrication

Devices were prepared by the following procedure.

The following procedure is based on the fabrication procedure of the sixth embodiment.

<Preparation of Template/Mold>

(1) Positive photoresists (OFPR8600; manufactured by Tokyo Ohka Kogyo Co., Ltd.) were spin-coated on the surfaces of Si(100) substrates by a spin coater at 500 rpm for 5 sec and 3000 rpm for 120 sec.

Thereafter, the solvent was evaporated by heating on a hot plate at 90° C. for 12 minutes to fix the resist on the substrate.

(2) A photomask designed to expose the portion where the nanowires were grown was overlaid on the heated substrate.

After the substrate was irradiated with 600 mJ/cm2 i-rays by an exposure machine, the substrate was immersed in a developer to remove the exposed positive type photoresist. The substrate was taken out from the developer, washed with flowing water, and then heated by a hot plate at 90° C. for 5 minutes to complete patterning of the positive photoresist.

(3) Using a sputtering apparatus, Cr was sputtered under conditions of $1.2 \times 10^{-2}$ Pa and 14 min, and a Cr layer of 135 nm was deposited on the positive photoresist and the substrate.

(4) After immersing the substrate on which the Cr layer was deposited in 2-propanol warmed to 70° C. on a hot plate for 40 minutes, the resist except for the portion where the nanowires are grown was roughly removed by performing ultrasonic treatment for 2 minutes with an ultrasonic instrument.

Thereafter, the substrate was transferred to 2-propanol heated to 70° C. in a separate container, immersed for 10 minutes, and then subjected to ultrasonic treatment for 1 minute to completely remove the resist except for the portion where the nanowires are grown.

Finally, fine Cr particles on the substrate were removed by rinsing with 2-propanol heated to 70° C. in a further container.

The substrates are 2 h heated in an electric oven at 400° C. Thus the Cr layer was oxidized to produce a catalyst layer for growing nanowires.

(5) To 200 ml of ultrapure water, hexamethyl enetetramine (hexamethyl enetetramine: HMTA) was dissolved to 15 mM, and stirred with a stirrer for 7 min.

Further, zinc nitrate hexahydrate ($Zn(NO_3)_2 \cdot 6H_2O$, 98%, manufactured by Sigma-Aldrich Co.) was dissolved to 15 mM, and stirred for 7 min to prepare a nanowire growing solution.

The substrates produced in the above (4) were immersed in a nanowire growth solution, and the solution was heated at 95° C., 3 h in an air-blowing constant-temperature high-temperature oven to grow nanowires.

Thereafter, the substrate was washed away with ultrapure water, and the nonspecifically grown nanowires were removed to produce a template.

<Manufacturing of Substrate in Which an End of the Nanowires are Embedded>

(6) The mold produced in the above (5) was placed in a petri dish.

Next, the PDMS prepolymer and the curing agent were put in a container at a weight ratio of 10:1, and then the mixture was poured into a petri dish at 2000 rpm for 2 min and 2200 rpm for 6 min, and air bubbles in the polymer were removed by 2 h evacuation.

After 2 h passed, the polymer was cured at 80° C. for 2 h on a hot plate.

By these operations, the nanowires formed on the substrates were embedded in the PDMS.

The nanowire-embedded PDMS substrate was peeled from the original substrate.

(7) Nanowires were grown on the peeled PDMS substrates in the same manner as in (5) above.

Thereafter, the PDMS substrate was washed away with ultrapure water to remove the nanowires grown nonspecifically, thereby manufacturing a substrate in which the ends of the nanowires were embedded in the first surface.

<Manufacturing of Cover Portion (Cover)>

(8) A negative type photoresist was applied onto the Si substrate by a spin coater, a photomask having a shape capable of exposing a flow path portion was covered with the photoresist, and exposure and development were performed to produce a mold in which a portion forming the flow path became convex.

(9) The polymer was polymerized and cured on the mold in the same procedure as in (6) above except that the mold produced in (8) above was used.

The cured polymer was cut out, and a sample input bid and a sample collection hole were punched in the flow path with a punch of 0.32 mm to prepare a cover member.

The manufacturing method and the form of the cover member are not limited to those described above.

In some embodiments, the bonding of the substrate and the cover member may be carried out by using an organic adhesive.

An adhesive sheet may be used.

A cover member or a substrate having an adhesive or an adhesive sheet on its surface may be used.

The substrate and the cover member may be bonded to each other by bonding solids such as anodic bonding.

In some embodiments, the cover member may include or consist of a sealing agent.

In some embodiments, the covering member may be formed of PDMS.

In some embodiments, the cover member may be formed as a single member.

For example, the channel may be formed as a recess in the cover member.

The cover member may comprise a plurality of members.

For example, it may be composed of a member defining a side wall of the flow path and a member defining an upper portion of the flow path, i.e., an inner wall facing the substrate.

The cover member may comprise, for example, a member having a punched portion to define a side wall of the flow path, and a member defining an upper portion of the flow path, i.e., an inner wall facing the substrate.

The cover member may be, for example, a member having a punched portion for defining a side wall of the flow path, and may be configured as a spacer for defining a size of a height of the flow path, i.e., an upper surface of the substrate and an inner wall facing the substrate.

The cover member may include a spacer and a cover defining an upper portion of the flow path.

The cover member, the cover, and the spacer may have a single-layer structure, and may have a structure having a plurality of layers (N layers) such as a two-layer structure and a three-layer structure.

Figure 14:
FIG. 14 is a cross-sectional view describing a fluidic device according to an embodiment.

FIG. 14 schematically shows a cross-section of a flow path (fluid) device (or analytical, extraction, collection, or capture device) 51 according to an embodiment.

In some embodiments, the cover member may be comprised of a combination of a plurality of members.

For example, the cover member may be formed by stacking or adhering a plurality of layers.

The flow path device of FIG. 13 has two cover members 54 and 55.

The channel device 51 includes a substrate 52 and nanowires 53 disposed on the substrate 52.

The nanowires 53 may be disposed directly on the substrate 52, may be embedded in the substrate 52 at one end thereof, or may be formed on a catalyst (not shown) on the substrate 52.

FIG. 14 is intended to illustrate an exemplary or illustrative configuration and does not limit the method or mode of arrangement or growth of the nanowires 53 on the substrate 52.

A cover (or hereinafter also referred to as top cover 54) is bonded to the substrate 52 via a spacer 55.

In some embodiments, the spacer 55 may be a planar member of substantially uniform thickness.

Thereby, for example, the distance between the substrate 52 and the cover 54 can be kept substantially uniform in the flow path.

Further, for example, the step of bonding can be simplified.

In some embodiments, the spacer may have a structure in which the flow path portion is cut out.

The cut-out or penetration of the channel portion of the spacer may be performed mechanically by punching or cutting, may be performed chemically by etching, or may be performed by other methods.

In some embodiments, the cutouts or penetrations of the spacer may be formed as closed structures, e.g., holes, in the spacer.

In some embodiments, the cutout or penetration of the spacer may be formed with an open structure (e.g., a flow port leading to the outside) in which a portion (or portions) is open on a side or corner of the spacer.

The inner wall in the thickness direction may define the structure of the flow path together with the surface of the substrate 52 on which the nanowires 53 are disposed and the inner wall of the cover 54.

Figure 15:
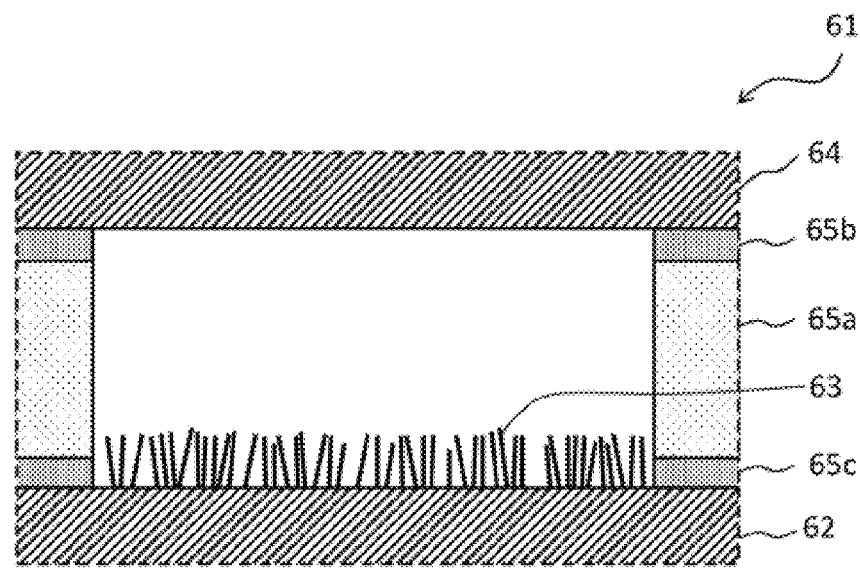
FIG. 15 is a cross-sectional view describing a fluidic device according to an embodiment.

FIG. 15 schematically shows a cross-section of a flow path device 61 according to an embodiment.

The device 61 shown in FIG. 15 includes a substrate 62, nanowires 63 disposed on the substrate 62, a top cover 64, and spacers 65a, 65b, and 65c sandwiched between the substrate 62 and the top cover 64.

The device 61 includes a substrate 62, spacers 65a, 65b, and 65c, and a top cover 64 bonded to each other.

In FIG. 15, the spacer has a three-layer structure.

In some embodiments, bonding layers (adhesive layers) 65b and 65c may be disposed on the upper and lower surfaces of the spacer main member 65a.

In some embodiments, the adhesive layers 65b, 65c may consist substantially of an adhesive.

In some embodiments, the adhesive layers 65b, 65c may consist substantially of an adhesive film, and an adhesive material may be applied to the upper and lower surfaces thereof.

In some embodiments, both the upper and lower spacers 65b, 65c may be non-stick films.

In some embodiments shown in FIGS. 14 and 15, the inner wall of the flow path may include a non-planar region or a so-called chaotic mixer.

Figure 16:
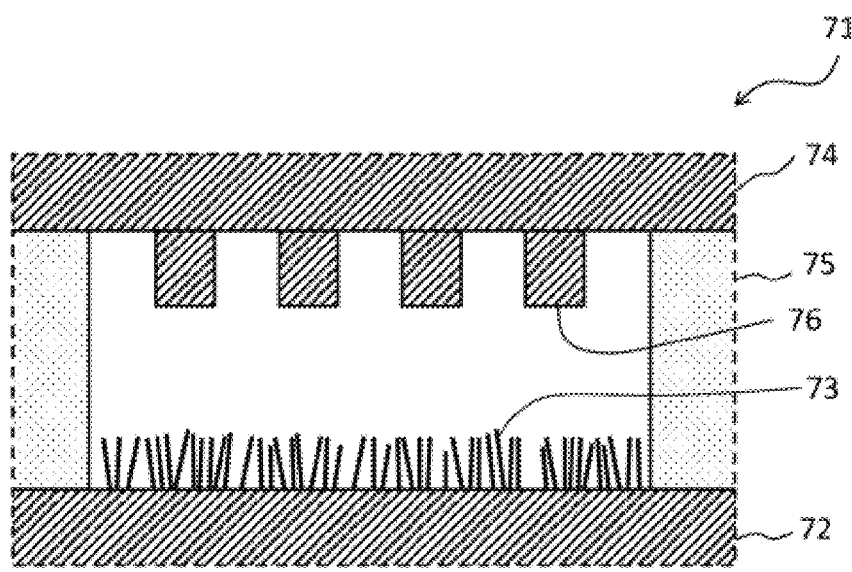
FIG. 16 is a cross-sectional view describing a fluidic device according to an embodiment.

FIG. 16 schematically shows a cross-section of a flow path device (or analytical, extraction, collection, or capture device) 71 according to an embodiment.

The device 71 shown in FIG. 16 includes a substrate 72, nanowires 73 disposed on the substrate 72, a top cover 74, and a spacer 75 sandwiched between the substrate 72 and the top cover 74.

The device 71 is formed by bonding a substrate 72, a spacer 75, and a top cover 74.

The top cover 74 of FIG. 15 has a non-planar region or uneven (concavo-convex) structure 76.

In some embodiments, the uneven structure 76 may comprise a chaotic mixer.

In some embodiments, the unevenness or structures disposed within the interior space may be so-called chaotic mixers (chaotic mixers, fluid agitators) and may have a structure that causes nonlinear and/or three-dimensional flow of the fluid flowing through the interior space.

Such a structure may have, for example, a step, a change in cross-sectional area, a change in the direction of the flow path, or the like in the flow path.

The chaotic mixer structure 76 causes advection or turbulence, for example, as the fluid flows through the flow path.

Thus, for example, the probability of substantial contact between the trapped substance in the fluid and the nanowires 73 can be improved.

The cover member may comprise more than two members or layers.

For example, the top cover 54 of the device shown in FIG. 14 may be formed of multiple members or multiple layers.

For example, the spacer 55 of the device shown in FIG. 14 may be formed of a plurality of members or layers.

For example, both the top cover 54 and the spacer 55 of the device shown in FIG. 14 may be formed of multiple members or multiple layers.

In some embodiments, the spacer may have a fluid agitation structure and may have a structure that has the function of agitating the fluid.

In some embodiments, the spacer may be comprised of multiple layers of superposition or combination.

In some embodiments, the superimposed layers may have substantially identical cutouts (through-holes).

In some embodiments, the through-holes may substantially overlap each other when the multiple layers are stacked.

In some embodiments, at least one of the superimposed layers may have a different cutout (through-hole) than at least one of the other layers.

In some embodiments, the through holes may not be identical to each other when multiple layers are superimposed.

In some embodiments, a through-hole of one layer may not substantially overlap with another through-hole of at least one other layer when multiple layers are superimposed.

In some embodiments, the through holes in at least some of the layers of the stacked layers may be offset.

In some embodiments, multiple layers may be superimposed such that the respective through-holes are staggered.

In some embodiments, the sides of the through-holes may have a three-dimensional structure.

In some embodiments, the sides of the through-holes of a spacer layer may have a three-dimensional structure.

In some embodiments, the three-dimensional structure on the side surfaces of the through-holes may be configured by combining through-holes of each layer having side surfaces formed substantially in the thickness direction, in the thickness direction.

In some embodiments, offsets or staggered arrangements of through-holes between layers may be used to form a chaotic mixer or fluid agitating structure on the sides of the flow path.

Seventh Embodiment

Figure 17:
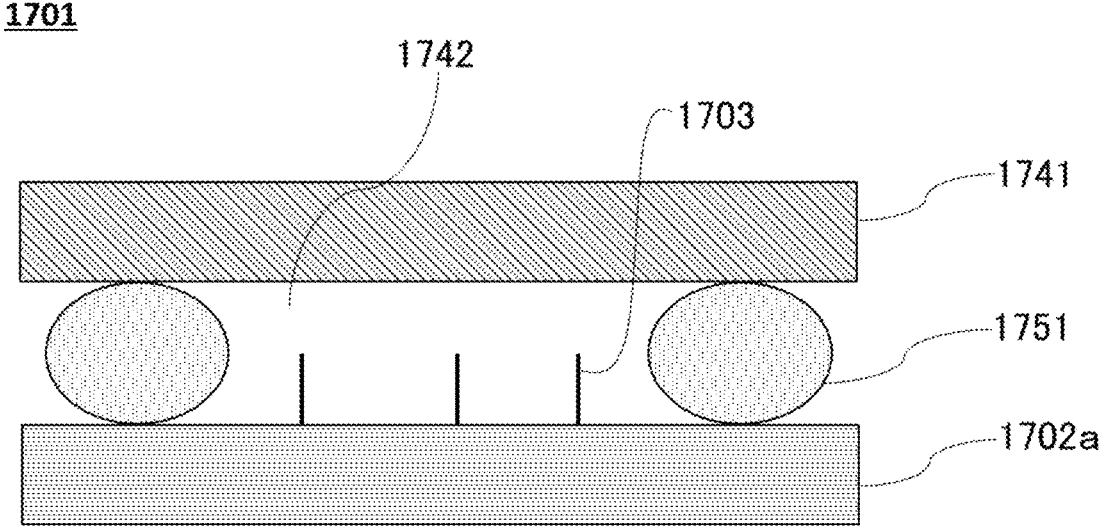
FIG. 17 is a cross-sectional view describing a fluidic device according to an embodiment.

A device 1701 according to an embodiment will be described with reference to FIG. 17. FIG. 17 is a cross-sectional view (in the same orientation as the view shown in FIG. 1B) of a device 1701 according to an embodiment.

The device 1701 shown in FIG. 17 includes a substrate 1702a on which nanowires 1703 are disposed, a cover (a cover member ceiling part) 1741 bonded to the nanowire surface, and an elastic body 1751 sandwiched between the substrate 1702a and the cover 1741.

The elastic body 1751 is elastically deformed by being pushed by the substrate 1702 and the cover 1741, and is in liquid-tight contact with each surface.

The flow path 1742 is substantially defined as a region surrounded by the substrate 1702a, the cover 1741, and the elastic body 1751.

The elastic body 1751 forms a side wall of the flow path 1742.

The elastic body 1751 may be an O-ring.

The O-ring 1751 and the substrate 1702a, and the O-ring 1751 and the cover 1741 are not adhered to each other using an adhesive or the like.

The O-ring 1751 may be elastically deformed, plastically deformed, elasto-plastically deformed, or not deformed upon assembly.

After assembly, the O-ring 1751 may define a space between the substrate 172a and the cover member ceiling 1741a and may function as a spacer.

In some embodiments, the O-ring 1751 may be adhered to the substrate 1702a and/or the cover member ceiling part 1741a using an adhesive or the like.

In some embodiments, the cover member ceiling part 1741a and the substrate 172a may be crimped using screws or the like.

The O-ring may be elastically deformed by applying pressure.

As a result, for example, the O-ring 1751, the substrate 1702a, the O-ring 1751, and the cover member ceiling part 1741 can be held in a liquid-tight manner without using an adhesive or the like.

In some embodiments, the O-ring 1751 and the substrate 1702a and the O-ring 1751 and the cover 1741 may be adhered to each other using an adhesive or the like.

In the device 1701 according to the embodiment shown in FIG. 17, the substrate 1702a, the O-ring 1751, and the cover member ceiling 1741 part can be easily removed.

Therefore, in this configuration, for example, only the substrate 1702a can be replaced and the ring 1751 and the cover member ceiling part 1741 can be reused, so that the manufacturing cost can be reduced.

With this configuration, since the substrate 1702a can be easily separated from the cover 1741 by way of example, a sample adsorbed on the nanowires 1703 on the substrate 1702a can be easily observed.

The O-ring 1751 may be an elastic body such as silicone rubber, natural rubber, teflon, or urethane.

The O-ring may not have a circular form, and also may be a square corner ring, a D-formed ring, an X-formed ring, or the like.

<Manufacturing of Device>

The bonding was completed by overlapping the first surface of the fabricated substrate and the second surface of the cover member, tubing the interface with a PEEK tube, applying an uncured PDMS to the root of the tube and the interface between the substrate and the cover member, and heating on a hot plate at 180° C. for 30 minutes. Since the first surface of the substrate and the second surface of the cover member were flat, they could be bonded without any particular problem.

The device of Example 1 was produced by the above procedure.

In addition, a tube for sample insertion and collection was inserted into the sample insertion hole and the sample collection hole, and the insertion portion was fixed with an adhesive.

Figure 20:
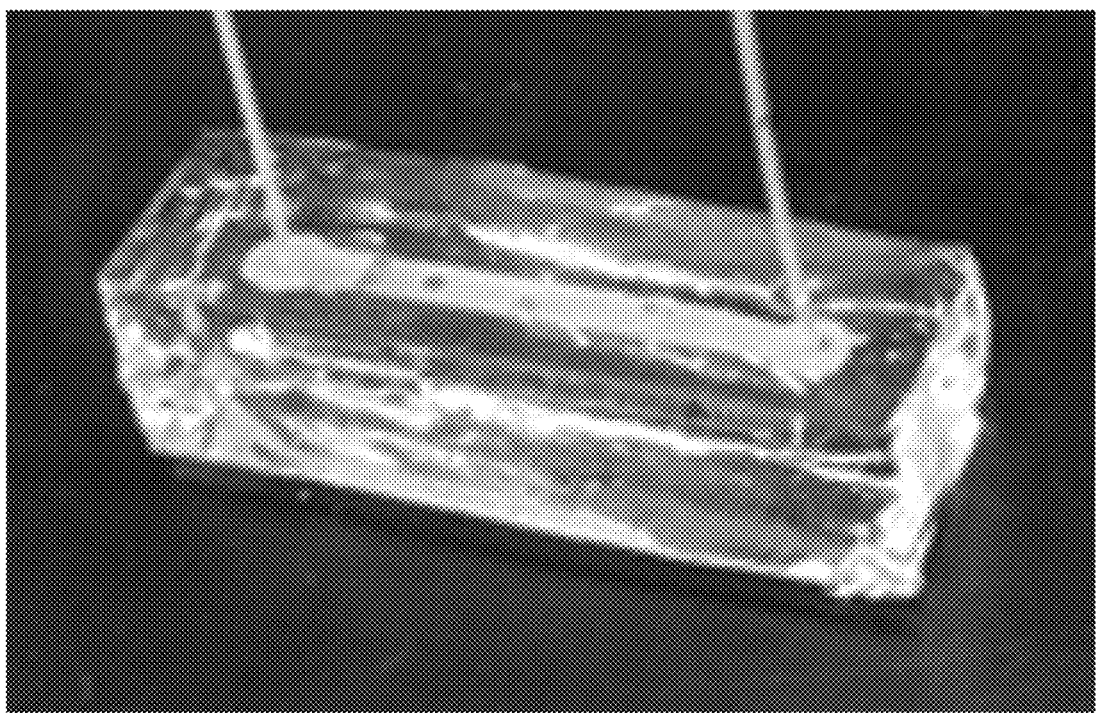
FIG. 20 is a photograph of a device produced in Example 1.

FIG. 20 shows a photograph of the device manufactured in Example 1.

<Adsorption of Extracellular Vesicles Using Devices>

Next, adsorption and FESEM (field emission scanning electron microscopy) of extracellular vesicles were performed using the devices prepared in Example 1.

<Sample Preparation>

1 mL of commercial urine was dispensed into 1.5 mL centrifuge tubes which were set in a chill centrifuge and centrifuged at 3000×g, 15 min, 4° C. to precipitate impurities. Hereinafter, the supernatant portion excluding the impurities is referred to as a "urine sample".

<Adsorption of Extracellular Vesicles to Nanowires>

1 mL of the prepared urine sample was introduced into the device from the sample input hole by a syringe pump under the condition of a flow rate of 50 µL/min, whereby extracellular vesicles were adsorbed on the nanowires.

<Observation of Extracellular Vesicles Adhered to Nanowires>

After urine samples were flowed in the manner as explained in <Adsorption of Extracellular Vesicles to Nanowires>, the cover member was peeled off from the substrates, and FESEM imaging of the nanowires 3 was performed.

Figure 21:
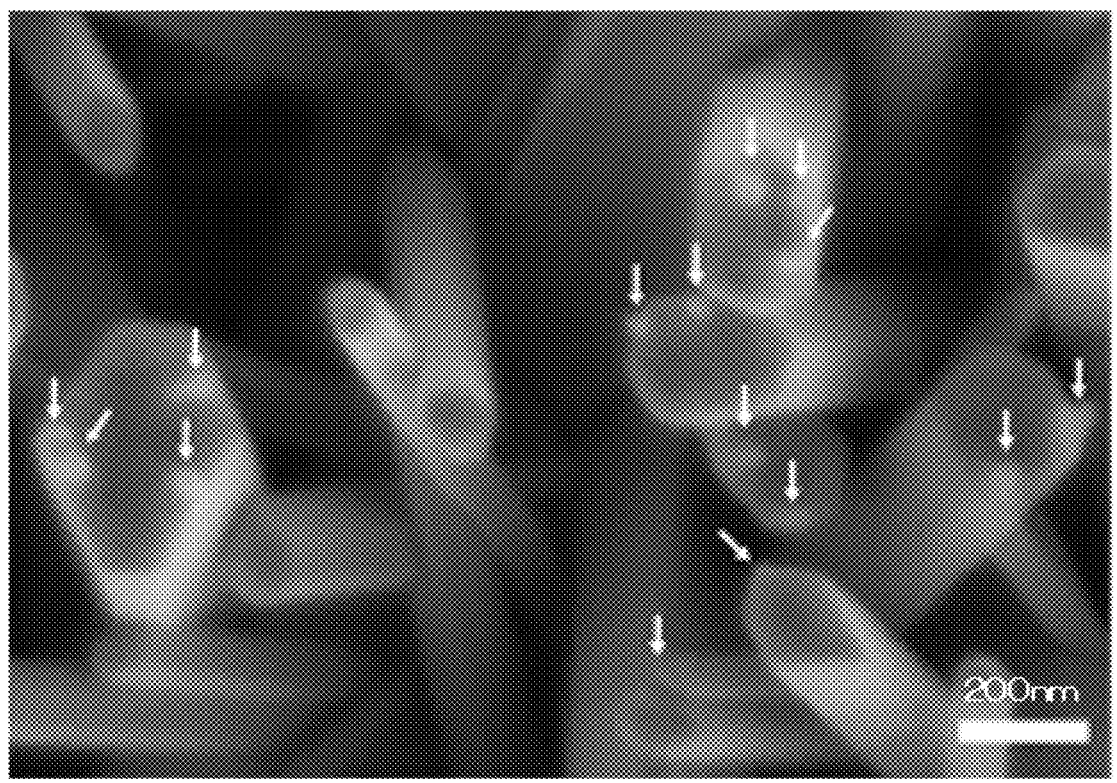
FIG. 21 is a FESEM photograph of nanowires adsorbing extracellular vesicles.

FIG. 21 shows an imaged FESEM photograph.

The area indicated by the white arrow in the photograph is the adsorbed extracellular vesicle.

The device made in Example 1 does not include an electrode.

Therefore, problems such as charge-up did not occur, and a good FESEM image was obtained as shown in FIG. 21.

In addition, since there is no wall surface around the nanowire, the focus adjustment could be carried out without any problem.

The present disclosure includes the following embodiments:

1 An analytical device comprising a substrate, nanowires, and a cover member, wherein
the nanowires are formed on a first surface of the substrate,
the cover member includes a base material for a cover member and a flow channel formed on a second surface of the base material for the cover member,
at least a portion of the first surface of the substrate and a second surface of the base material for the cover member are in liquid-tight contact with each other, and
at least a portion of the nanowires are disposed in the flow channel.

2 The analytical device according to embodiment 1,
wherein a catalyst layer for forming the nanowires is formed on a first surface of the substrate, and
the nanowires are formed on at least a portion of the catalyst layer.

3 The analytical device according to embodiment 2,
wherein only the catalyst layer is formed on the first surface of the substrate, and only the nanowires are formed on the catalyst layer.

4 The analytical device of embodiment 1, wherein the ends of the nanowires are embedded in a first surface of the substrate.

5 The analytical device according to embodiment 4,
wherein only the nanowires are formed on the first surface of the substrate.

6 The analytical device according to any one of embodiments 1 to 5,
wherein when the first surface of the substrate and the second surface of the cover member are overlapped, both of the overlapping surfaces of the first surface and the second surface are planar.

7 The analytical device according to any one of embodiments 1 to 6,
wherein the cover member includes a sample input hole and a sample collection hole.

8 The device for analysis according to any one of embodiments 1 to 7,
wherein a nonplanar region for generating turbulence in the sample liquid passing through the flow path is formed in the flow path.

A separation device comprising: a cover having a bonding surface and a recess; a substrate; and nanowires disposed on at least a portion of a first surface of the substrate, wherein the portion of the first surface of the substrate and the bonding surface of the cover are in intimate contact, and wherein the recess of the cover and a portion of the nanowire surface facing the recess define a fluid chamber.

A2 The separation device according to embodiment A1, wherein the substrate has a catalyst layer for forming the nanowires on at least a portion of the first surface, and the nanowires are formed on the catalyst layer.

A3 The isolation device of embodiment A1, wherein one end of the nanowire is embedded in the substrate.

A4 The separation device according to any one of embodiments A1 to A3, wherein the cover member has an inlet for introducing a solution into the fluid chamber from the outside and an outlet for discharging the solution from the fluid chamber to the outside.

A5 The separation device according to embodiment A4, wherein the inner wall of the fluid chamber has a uneven structure that generates turbulence for the solution flowing in the fluid chamber.

B1 A fluidic device for separating biomolecules, comprising: a substrate having a planar surface; nanowires disposed on at least a portion of the planar surface; and a fluidic chamber formed to include at least a portion of the nanowires.

B2 The fluidic device of embodiment B1, further comprising a cover having a bonding surface in intimate contact with a portion of the flat surface, the cover having a recess defining the flow path with the flat surface of the substrate.

B2b A fluidic device for separating biomolecules, the fluidic device comprising: a substrate having a planar surface; nanowires disposed on at least a portion of the planar surface; and a cover having a bonding surface in intimate contact with a portion of the planar surface, the cover having a recess defining a flow path to include at least a portion of the nanowire with the planar surface of the substrate.

B3 The fluidic device of embodiment B1, B2 or B2b, wherein a catalyst layer for nanowire growth is formed on the planar surface of the substrate, and the nanowires are formed on the catalyst layer.

B4 The fluidic device of embodiment B1, B2 or B2b, wherein one end of the nanowire is embedded in a planar surface of the substrate.

B5 The fluidic device of any one of embodiments B1 to B4, further comprising: an inlet for introducing a solution into the fluidic chamber; and an outlet for discharging the solution from the fluidic chamber.

B6 The fluidic device of embodiment B2 or B2b, wherein the cover has an inlet for introducing a solution into the fluidic chamber and an outlet for discharging a solution from the fluidic chamber.

B7 The fluidic device of embodiment B6, wherein a microstructure for agitating the flow of the solution is formed on the surface of the concave portion of the cover.

B8 The fluidic device of any one of embodiments B1 to B7, wherein the biomolecule comprises RNA.

B9 The fluidic device of any one of embodiments B1 to B7, wherein the biomolecule comprises an extracellular vesicle.

B10 A method for separating a biomolecule, comprising: providing a fluidic device comprising: a substrate having a planar surface; nanowires disposed on at least a portion of the planar surface; and a channel formed to include at least a portion of the nanowire; and introducing a solution containing the biomolecule into the fluidic device.

B11 The method for separating a biomolecule, according to embodiment B10, wherein the biomolecule comprises at least one of cells, viruses and bacteria.

B12 The method for separating a biomolecule, according to embodiment B11, wherein the biomolecule comprises an extracellular vesicle.

B13 The method of separating a biomolecule, according to embodiment B12, further comprising introducing a lysis solution into the fluidic device.

B14 The method for separating a biomolecule, according to embodiment B13, further comprising: discharging from the fluidic device the cell lysis solution introduced into the fluidic device; and measuring nucleic acids contained in the cell lysis solution discharged from the fluidic device.

B15 The method of separating a biomolecule, according to embodiment B14, wherein the nucleic acid comprises RNA.

While several embodiments and examples of the present disclosure have been described above, these embodiments and examples/aspects are used for exemplarily explanations of the present disclosure.

For example, each of the embodiments described above has been described in detail in order to explain the present disclosure in an easy-to-understand manner, and dimensions, configurations, materials, and circuits may be additionally changed as necessary.

Embodiments in which one or more of the above-mentioned features of the present disclosure are arbitrarily combined are also included in the scope of the present disclosure.

It is intended that the appended claims cover numerous modifications to the embodiments without departing from the spirit and scope of the present disclosure. Accordingly, the embodiments and examples disclosed herein are presented for purposes of illustration and should not be construed as limiting the scope of the present disclosure.

EXPLANATION OF REFERENCE NUMBERS

51、61、71、101、201、801、901、1001、1201、1301、1701 . . . device
52, 62, 72, 102, 202, 302, 402, 802, 802a, 902, 1002a, 1202, 1302a, 1702a, 1802, 1902 . . . substrate
53, 63, 73, 103, 203, 303, 403, 803, 803a, 903, 1003, 1203, 1303, 1703, 1803, 1903 . . . nanowires
54、64、74、1741 . . . top cover
55, 65a, 65b, 65c, 75 . . . spacers
76、746 . . . nonplanar region
102a, 202a . . . flat surface
104、204、504、604、704、804、904、1004、1104、1204、1304 . . . cover member (cover)
105、205、305、405、805、905、1205 . . . catalyst layer
105a . . . first surface
141、241、541、641、741、1041、1341 . . . base material for cover member
142、242、542、642、742、842、942、1042、1342、1742 . . . fluid channels
143、243、1143 . . . sample input holes
144, 244, 1144 . . . sample collection holes
147、547、647、747、947 . . . second surface
306、406、1206 . . . resist
802 . . . temporary substrate 1751 . . . elastic (O-ring)
1803a, 1903a . . . growth nuclei of nanowires
1803b . . . adhesive
1903b . . . adhesive layer

The invention claimed is:

1. A fluidic device for separating a biomolecule comprising:
    a substrate having a planar surface;
    nanowires disposed on at least a portion of the planar surface; and
    a cover having a bonding surface and a recess surrounded by the bonding surface, the bonding surface being in intimate contact with a portion of the planar surface of the substrate,
        wherein the planar surface of the substrate and the recess of the cover define a fluid chamber including at least a portion of the nanowires.

2. The fluidic device of claim 1, wherein a catalyst layer for nanowire growth is formed on a planar surface of the substrate, and the nanowire is formed on the catalyst layer.

3. The fluidic device of claim 1, wherein one end of the nanowire is embedded in a planar surface of the substrate.

4. The fluidic device of claim 1, comprising an inlet for introducing a solution into the fluidic chamber and an outlet for discharging a solution from the fluidic chamber.

5. The fluidic device of claim 1, wherein the cover has an inlet for introducing a solution into the fluid chamber and an outlet for discharging a solution from the fluid chamber.

6. The fluidic device of claim 5, wherein a surface of the recess of the cover is formed with a microstructure for agitating the flow of the solution.

7. The fluidic device of claim 1, wherein the biomolecule comprises RNA.

8. The fluidic device of claim 1, wherein the biomolecule comprises an extracellular vesicle.

9. A method of separating a biomolecule comprising:
    providing a fluidic device comprising a substrate having a planar surface;
    nanowires disposed on at least a portion of the planar surface;
    a cover having a bonding surface and a recess surrounded by the bonding surface, the bonding surface being in intimate contact with a portion of the planar surface of the substrate,
    wherein the planar surface of the substrate and the recess of the cover define a fluid chamber including at least a portion of the nanowires; and
    introducing a solution comprising the biomolecule into the fluidic device.

10. The method of claim 9, wherein the biomolecule comprises at least one of a cell, a virus, and a bacterium.

11. The method of claim 10, wherein the biomolecule comprises an extracellular vesicle.

12. The method of claim 11, further comprising introducing a cell lysate into the fluidic device.

13. The method of claim 12, further comprising: draining the cell lysate introduced into the fluidic device from the fluidic device; and measuring nucleic acids contained in the cell lysate drained from the fluidic device.

14. The method of claim 13, wherein the nucleic acid comprises RNA.

* * * * *